United States Patent
Vaschillo et al.

(10) Patent No.: US 7,739,223 B2
(45) Date of Patent: Jun. 15, 2010

(54) MAPPING ARCHITECTURE FOR ARBITRARY DATA MODELS

(75) Inventors: Alexander Vaschillo, Redmond, WA (US); Ilker Cengiz, Redmond, WA (US); Bertan Ari, Bellevue, WA (US); Srinivasa R. Burugapalli, Sammamish, WA (US); Luca Bolognese, Redmond, WA (US); Avner Y. Aharoni, Seattle, WA (US); Steven D. White, Bellevue, WA (US); Alex Laskos, Redmond, WA (US); Andrew J. Conrad, Sammamish, WA (US); Todd F. Pfleiger, Seattle, WA (US); Jason Z. Zhu, Redmond, WA (US); Chris Suver, Seattle, WA (US); David Schach, Redmond, WA (US); Adam J. Wiener, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 751 days.

(21) Appl. No.: 10/652,214

(22) Filed: Aug. 29, 2003

(65) Prior Publication Data

US 2005/0050068 A1 Mar. 3, 2005

(51) Int. Cl.
*G06F 17/30* (2006.01)
(52) U.S. Cl. .................... 707/101; 707/100
(58) Field of Classification Search .......... 707/2, 707/3, 100–102, 103 R
See application file for complete search history.

(56) References Cited

U.S. PATENT DOCUMENTS

| | | | |
|---|---|---|---|
| 5,315,709 A * | 5/1994 | Alston et al. ............ 707/6 |
| 5,668,991 A | 9/1997 | Dunn | |
| 5,710,917 A | 1/1998 | Musa et al. | |
| 5,729,739 A | 3/1998 | Cantin | |
| 5,926,833 A | 7/1999 | Rasoulian et al. | |
| 5,937,409 A | 8/1999 | Wetherbee | |
| 5,987,247 A | 11/1999 | Lau | |
| 6,006,230 A | 12/1999 | Ludwig | |
| 6,018,743 A | 1/2000 | Xu | |
| 6,038,565 A | 3/2000 | Nock | |
| 6,041,386 A | 3/2000 | Bello | |
| 6,061,515 A | 5/2000 | Chang | |
| 6,076,090 A | 6/2000 | Burroughs et al. | |
| 6,154,748 A | 11/2000 | Gupta et al. | |
| 6,370,541 B1 | 4/2002 | Chou | |
| 6,569,207 B1 | 5/2003 | Sundaresan | |

(Continued)

OTHER PUBLICATIONS

Hong-Hai Do, et al., COMA—A System for Flexible Combination of Schema Matching Approaches, In Proceedings of the 28th International Conference on Very Large Databases (VLDB), 2002.

(Continued)

*Primary Examiner*—Khanh B Pham
(74) *Attorney, Agent, or Firm*—Workman Nydegger

(57) ABSTRACT

A data mapping architecture for mapping between two or more data sources without modifying the metadata or structure of the data sources themselves. Data mapping also supports updates. The architecture also supports at least the case where data sources that are being mapped, are given, their schemas predefined, and cannot be changed. The architecture includes a mapping component that receives respective metadata from at least two arbitrary data models, and maps expressions between the data models.

43 Claims, 8 Drawing Sheets

U.S. PATENT DOCUMENTS

| | | | |
|---|---|---|---|
| 6,581,062 | B1 | 6/2003 | Draper |
| 6,631,519 | B1 | 10/2003 | Nicholson |
| 6,769,124 | B1* | 7/2004 | Schoening et al. .......... 719/316 |
| 6,820,135 | B1* | 11/2004 | Dingman et al. ............ 709/246 |
| 6,853,997 | B2 | 2/2005 | Wotring |
| 6,907,433 | B2 | 6/2005 | Wang |
| 7,136,843 | B2 | 11/2006 | Bigus |
| 7,403,956 | B2 | 7/2008 | Vaschillo |
| 2002/0078094 | A1 | 6/2002 | Krishnaprasad |
| 2002/0103793 | A1 | 8/2002 | Koiler |
| 2003/0055828 | A1 | 3/2003 | Koch |
| 2003/0074358 | A1* | 4/2003 | Sarbaz et al. ................. 707/10 |
| 2003/0093770 | A1* | 5/2003 | Fernandez .................. 717/118 |
| 2003/0101170 | A1 | 5/2003 | Edelstein et al. |
| 2003/0217069 | A1* | 11/2003 | Fagin et al. ................. 707/102 |
| 2004/0015783 | A1* | 1/2004 | Lennon et al. .............. 715/523 |
| 2004/0044959 | A1 | 3/2004 | Shanmugsundaram |
| 2005/0210124 | A1 | 9/2005 | Chua |
| 2005/0216501 | A1 | 9/2005 | Cengiz |
| 2009/0024642 | A1 | 1/2009 | Vaschillo |

OTHER PUBLICATIONS

Jayant Madhavan, et al., Generic Schema Matching with Cupid, In Proceedings of the International Conference on Very Large Databases (VLDB), 2001.

Philip A. Bernstein, "Applying Model Management to Classical Meta Data Problems", CIDR 2003-Innovative Data Systems Research, Proceedings of the First Biennial Conference ON, [Online] Jan. 7, 2003, pp. 1-12, XP002457989, Asilomar, CA, USA, Retrieved form the Internet: URL:http://www-db.cs.wisc.edu/cidr/cidr2003/program/p19.pdf> [retrieved on Nov. 8, 2007].

S. Melnik, et al., Association for Computing Machinery: "Rondo: A Programming Platform for Generic Model Management", SIGMOD 2003. Proceedings of the ACM Sigmod International Conference on Management of Data. San Diego, CA, Jun. 9-12, 2003, Proceedings of the ACM Sigmod International Conference on Management of Data, New York, NY: ACM, US, Jun. 9, 2003, pp. 153-204.

R. Torlone, et al., "A Unified Framework for Data Translation Over the Web", Web Information Systems Engineering, 2001, Proceedings of the Second International Conference ON, Piscataway, NJ, USA, IEEE, vol. 1, Dec. 3, 2001, pp. 350-358.

J. Madhavan, et al., "Generic Schema Matching with Cupid", Proceedings of the International Conference on Very Large Data Bases, 2001, pp. 1-10.

European Search Report for Patent Application No. EP04103079 dated Nov. 22, 2007, 5 pages.

Chaitanya Baru, "Xviews: XML Views of Relational Schemas" Proceedings of the Woekshop on Databases and Expert System Applications, 1999, pp. 1-6, Florence Italy.

Dongwon Lee et al., "NeT & CoT: Translating Relational Schemas to XML Schemas Using Semantic Constraints" Proceedings of the 11th International Conference on Information and Knowledge Systems, Nov. 4-9, 2002, pp. 282-291, McLean, Virginia.

Iraklis Varlamis et al., "Bridging XML-Schema and Relational Databases: A System for Generating and Manipulating Relational Databases Using Valid XML Documents", Proceedings of the 2001 ACM Symposium on Document Engineering, 2001, pp. 105-114.

Enterprise Java Beans Specification Version 2.1, http://java.sun.com/products/ejb/docs.html, Last viewed on Jun. 17, 2004, 646 pages.

JSR 12: Java Data Objects Specification Final Release 2, http://jcp.org/en/jsr/detail?id=012, Last viewed on Jun. 17, 2004, 200 Pages.

Oracle Application Server TopLink Unit of Work Whitepaper, http://otn.oracle.com/produts/ias/toplink/technical/unitOfWorkWP.pdf, Aug. 2003. 35 Pages.

CocoBase Enterprise O/R Dynamic Mapping for the Enterprose Version 4.0: Object Relational Mapping Concepts, http://www.thoughtinc.com/MappingConcepts.pdf. Last Changed on Oct. 17, 2002, 14 Pages.

J. Grundy, S. Newby, T. Whitmore, and P. Grundeman, Extending a Persistent Object Framework to Enchance Enterprise Application Server Perfromance, Proceedings fot eh 3rd Australasian Conference on Database Technologies—vol. 5, pp. 57-64, 2002.

Office Action dated Sep. 13, 2006 cited in U.S. Appl. No. 10/806,526.
Office Action dated Feb. 2, 2007 cited in U.S. Appl. No. 10/806,526.
Office Action dated Jul. 23, 2007 cited in U.S. Appl. No. 10/806,526.
Office Action dated Dec. 26, 2007 cited in U.S. Appl. No. 10/806,526.
Office Action dated Dec. 23, 2008 cited in U.S. Appl. No. 10/806,526.
Office Action dated Jul. 1, 2009 cited in U.S. Appl. No. 10/806,526.
Notice of Allowance dated Sep. 29, 2009 cited in U.S. Appl. No. 10/806,526.
Office Action dated Jul. 28, 2006 cited in U.S. Appl. No. 10/652,258.
Office Action dated Jan. 3, 2007 cited in U.S. Appl. No. 10/652,258.
Office Action dated May 30, 2007 cited in U.S. Appl. No. 10/652,258.
Office Action dated Oct. 12, 2007 cited in U.S. Appl. No. 10/652,258.
Office Action dated Dec. 21, 2007 cited in U.S. Appl. No. 10/652,258.
Notice of Allowance dated May 15, 2008 cited in U.S. Appl. No. 10/652,258.

\* cited by examiner

MAPPING ARCHITECTURE FOR ARBITRARY DATA MODELS

TECHNICAL FIELD

This invention is related to data mapping between data sources.

BACKGROUND OF THE INVENTION

The free flow of information prevalent today in wired and wireless regimes demands that the source and destination be compatible insofar as storing and interpreting the data for use. The world is populated with information sources where in many cases the data is represented differently from source to source. A major problem facing companies and individuals today is that data existing in one format may be needed in a different format for another purpose. However, such processes are being hampered by a largely disparate and ever-changing set of datasets. Such an example can be found in data warehousing where data is received from many different sources for storage and quick access from other sources. Converting from one data representation to another is not only time-consuming and resource intensive, but can be fraught with conversion problems, and in some cases, totally impracticable due to the complexity.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a mapping format designed to support a scenario where two (or more) data sources need to map to each other, without modifying the metadata or structure of the data sources themselves. Mapping is provided, for example, between an Object space and a relational database, Object space and XML data model, an XML data model and a Relational data model, or mapping could be provided between any other possible data model to XML, relational data model, or any other data model. The mapping format supports updates, and also supports the case where both data sources being mapped are given, their schemas are predefined, and cannot be changed (i.e., read-only). An approach that was previously used to map, for example, XML data to a relational database required making changes to the XML schema definition (XSD) file in order to add annotations. The mapping format of the present invention works as if the XSD file is owned by an external entity and cannot be changed. It also allows reuse of the same XSD file, without editing, for multiple mappings to different data sources (databases, etc.).

Each data model exposes at least one of three concepts (or expressions) to mapping: structure, field, and relationship. All of these concepts can be mapped between the data models. It is possible that one data model may have only one or two of the expressions to be mapped into another data model that has three expressions. The mapping structure is the base component of the mapping schema and serves as a container for related mapping fields. A field is a data model concept that holds typed data. Relationship is the link and association between two structures in the same data model, and describes how structures in the same domain relate to each other. The relationship is established through common fields of the two structures and/or a containment/reference where a structure contains another structure. These are just examples of relationships, since other relationships can be established (e.g., siblings, functions, . . . ). The present invention allows establishing arbitrary relationships. A member of a data model can be exposed as a different mapping concept depending on the mapping context.

Semantically, mapping is equivalent to a view (and a view is actually a query) with additional metadata, including reversibility hints and additional information about the two mapped domains. When one data source is mapped to another, what is really being requested is that it is desired that the Target schema is to be a view of the Source schema. Mapping is a view represented in one data domain on top of another data domain, and defines the view transformation itself. Mapping can create complex views with structural transformations on the data, which transformations create or collapse hierarchies, move attributes from one element to another, and introduce new relationships.

Mapping relates and connects the same mappable concepts between two or more mapped models. Mapping is also directional. Thus, one domain is classified as a Source and the other is classified as a Target. The directionality of mapping is important for mapping implementation and semantics, in that, a model that is mapped as a Source has different characteristics then a model that is mapped as a Target. The Target holds the view of the source model, where the mapping is materialized using the query language of the target domain. The Source is the persistent location of the data, and mapping translates the query written in the target domain query language to the source domain query language. One difference between Source and Target is that a structure or field from the Source or Target model has some restrictions regarding the number of mappings that can apply for structures and fields. In the target domain, a structure and a field can only be mapped once, whereas in the Source domain, a structure and a field can be mapped multiple times. For example, a Customers table can be mapped to a BuyingCustomer element and a ReferringCustomer element in the Target domain. However, a local element or local class can be mapped only once. Another difference that stems for the directional attribute of mapping is that mapping allows users to operate on the mapped models through the query language of the target domain (e.g., using XQuery for mapping a Relational model to an XML model, and OPath, for mapping a Relational model to an Object model).

Another important attribute of the mapping architecture is that of being updateable. In the past, developers had to write code to propagate and synchronize changes between the domains. However, in accordance with the present invention, the mapping engine now performs these tasks. That is, when the user creates, deletes, or modifies a structure in the target domain, these changes are automatically synchronized (persisted) to the source domain by the target API and mapping engine.

In another aspect thereof, the mapping architecture is stackable where multiple stages of mappings may occur from a source to a target.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents.

Other advantages and novel features of the invention may become apparent from the following detailed description of the invention when considered in conjunction with the drawings.

DETAILED DESCRIPTION OF THE INVENTION

Figure 1:
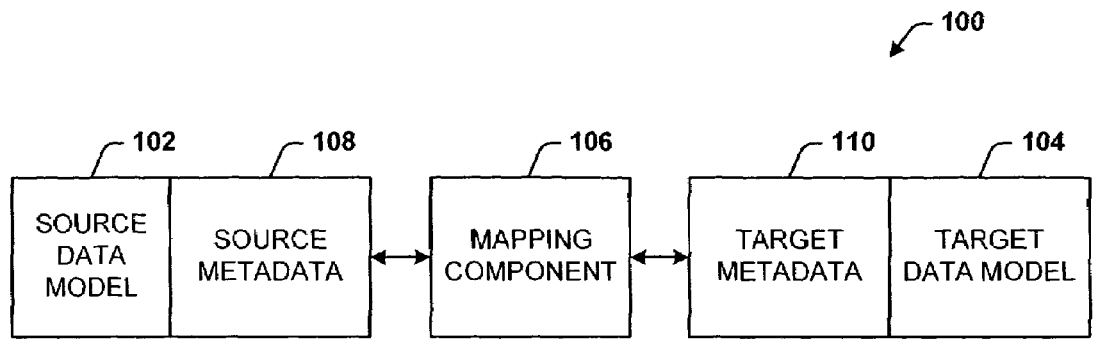
FIG. 1 illustrates a block diagram of a mapping system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Definitions

The following terms are used throughout the description, the definitions of which are provided herein to assist in understanding various aspects of the subject invention.

Model—a complex discrete structure that represents a design artifact, e.g., an XML schema, relational schema, and object schema.

Domain—one or more applications that manage data based upon a specific data model.

Object domain—ObjectSpace implementation of an object graph data model.

XML domain—stack of objects and query languages based upon the XML data model.

Relational domain—a DBMS (Database Management System) based upon the relational data model.

IDomainSchema—Model management object model that exposes the models as serializable, labeled directed graphs of mappable structures. The edges in the model graphs are referred to as "relationships." For example, XSOM (object model that exposes XML schema XSD (XML Schema Definition)), RSOM (an object model that exposes the relational schema RSD (Relational Schema Definition)), and OSOM (an object model that exposes the object schema OSD (Object Schema Definition)).

Mapping structure—the base component of the data model schema that serves as a container for related mapping fields (e.g., a table in a relational domain, complex type element in an XML domain, and class in an object domain).

Field—a data model concept that holds typed data. Conceptually, a field holds scalar values, although in some cases fields can hold complex data (e.g., XML data type and UDT). Further examples include columns of a relational data model, attributes and simple type elements in the XML domain, and properties in an object domain.

Relationship—the link and association between two structures in the same data model that describes how structures in the same domain relate to each other. The relationship is established through either common fields of the two structures and/or containment/reference where the structure contains another structure (e.g., XML containment hierarchy, and objects that reference another object through its field).

Referring now to FIG. 1, there is illustrated a block diagram of a mapping system 100 of the present invention. The framework provides the capability of the data models to perform CRUD (Create, Read, Update, and Delete) operations in their domain using their respective query languages or APIs (Application Programmable Interfaces), which are transformed to operations. For example, XML and object data models may perform CRUD operations in their domain using their query languages (e.g., XQuery and OPath, respectively), which are transformed to operations in the relational domain using its query language (e.g., SQL).

The system 100 includes a source data model 102 and a target data model 104, which mapping occurs from the source model 102 to the target model 104 via a mapping component 106. Each data model (102 and 104) has associated therewith metadata that exposes one or more entities that can be related. That is, the source model 102 exposes source metadata 108 and the target model 104 exposes target metadata 110, which metadata (108 and 110) each comprise conceptual entities that are directly relatable via the mapping component 106. The metadata entities include the concepts (or expressions) of structure, field, and relationship.

Mapping relates and connects between the same, different, or a combination of the same and different mappable concepts (described in more detail hereinbelow) from at least two mapped models. Mapping is directional. Thus some domains are classified as the sources 102 and others are classified as the targets 104. The directional aspect of the disclosed mapping architecture provides significance advantage for a mapping implementation and semantics. Additionally, a model that is mapped as the source 102 may have different characteristics then a model that is mapped as the target 104.

The target model 104 holds the view of the source model 102. That is, the mapping is materialized using the query language of the target domain. The source model 102 is the persistent location of the data, and the mapping component translates the query written in the target domain query language to the source domain query language.

A difference between the source 102 and target 104 is that a structure or field from the source or target model (102 or 104) has some restrictions regarding the number of mappings that can apply for structures and fields. In the target domain, a structure and a field can only be mapped once, whereas in the source domain, the structure and field can be mapped multiple times. For example, a Customers table can be mapped to a BuyingCustomer element and a ReferringCustomer element in the target domain. However, a local element or local class can be mapped only once. A more detailed description is provided herein with respect to examples, syntax, and semantics.

Another difference between source and target that stems from the directional attribute of mapping is that the mapping allows users to operate on the mapped models through the query language of the target domain (e.g., XQuery for a relational to XML mapping, and OPath for a relational to Object mapping).

Figure 2:
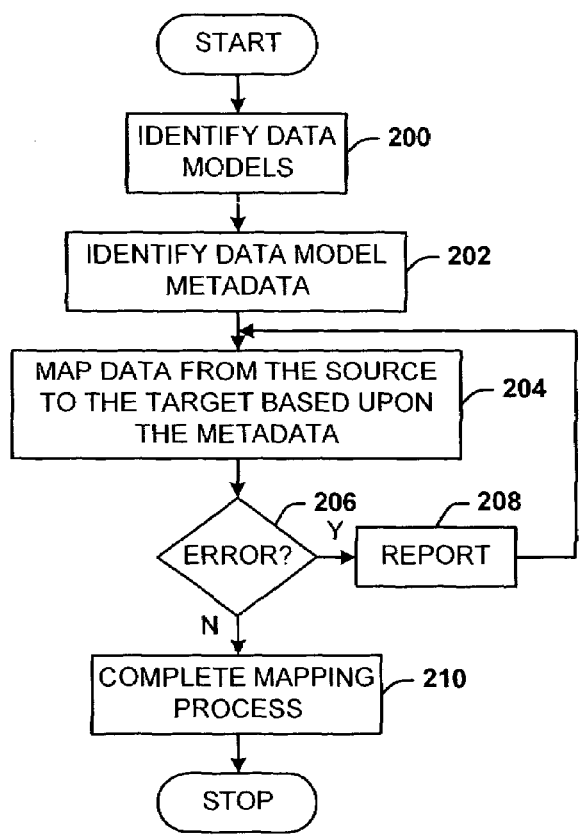
FIG. 2 illustrates a flow chart of a process in accordance with the present invention.

Referring now to FIG. 2, there is illustrated a flow chart of a process in accordance with the present invention. While, for purposes of simplicity of explanation, the one or more methodologies shown herein, e.g., in the form of flow chart, are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, the data models for data mapping are identified. At 202, once the data models are identified, the corresponding metadata for each model is identified. At 204, data mapping commences from the source model to the target model. At 206, the system determines if a mapping error has occurred. If YES, flow is to 208 to report the error. Flow is then back to the input of 204 to continue the mapping process. On the other hand, if a mapping error has not occurred, flow is from 206 to 210 to continue the mapping process until completed. The process then reaches a Stop block.

Figure 3:
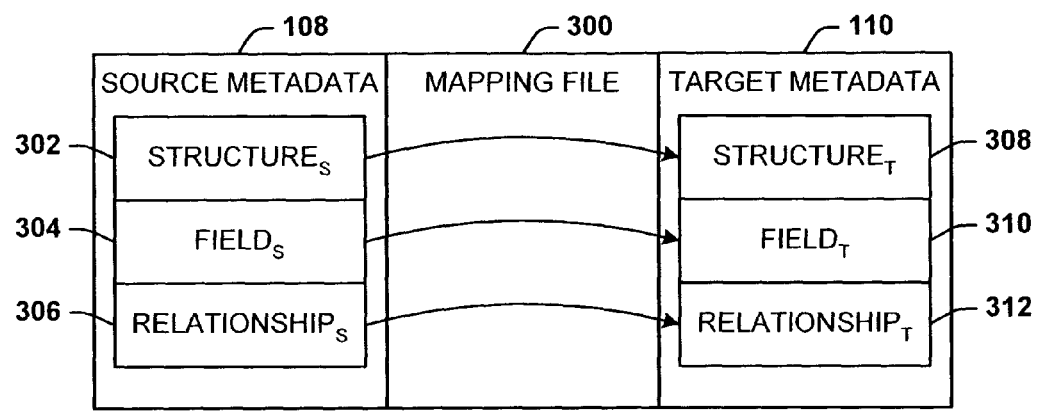
FIG. 3 illustrates a diagram of the conceptual metadata entities exposed to facilitate mapping of the source to the target.

Referring now to FIG. 3, there is illustrated a diagram of the conceptual metadata entities exposed to facilitate mapping of the source to the target. The mapping component comprises a mapping file 300 that aligns the mapping function between the source metadata 108 and the target metadata 110. In this particular embodiment, the source metadata 108 and target metadata 110 each comprise three entities that may be used to establish a mapping relationship: structure, field, and relationship. Thus the source metadata 108 includes a $STRUCTURE_S$ entity 302, a $FIELD_S$ entity 304, and a $RELATIONSHIP_S$ entity 306. Similarly, the target metadata 110 includes a corresponding $STRUCTURE_T$ entity 308, a $FIELD_T$ entity 310, and a $RELATIONSHIP_T$ entity 312.

The structure is the base component of the data model schema, and serves as a container for related mapping fields. Examples include a table in a relational domain, a complex type element in the XML domain, and a class in an object domain. A field entity is a data model concept that holds typed data. Conceptually, the field holds scalar values, although in some cases, the field can hold complex data (such as XML data type and UDT). Examples for mapping fields include columns in a relational data model, attributes and simple type elements in an XML domain, and properties in an object domain. The relationship is the link and association between two structures in the same data model, and describes how structures in the same domain relate to each other. The relationship is established through either common fields in the two structures, and/or containment/reference where a structure contains another structure, e.g., XML containment hierarchy, and an object that references another object through its field.

A member of a data model can be exposed as a different mapping concept depending on the mapping context. For example, an XML element can be exposed as a field and a structure (e.g., a simple type element and a complex type element). It is for the mapping and the IDomainSchema to determine if presenting the member as a specific concept is valid. Another example where a data model can be exposed as a different mapping concept involves a relational domain where expressions can also be a concept, e.g., in a custom table.

Mapping Semantics

Semantically, mapping is equivalent to a query/view with additional metadata including reversibility hints and additional information about the two mapped domains. When one data source schema is mapped to another, what is being requested is that it is desired for the target schema to be a view of the source schema. Mapping defines the view transformation itself. For example, when mapping a relational database to XML, the view is being defined where the look (or schema) is ultimately defined by XSD, and a mapping file defines how to generate (by processing and executing) this view over the relational database represented with an RSD file.

Mapping is a view represented in one data domain on top of another data domain. Understanding that mapping is such a view (and a view is actually a query) is important for understanding the semantics of mapping.

One could compare Mapping View to SQL View. SQL Server allows defining relational views on top of relational database. This view is defined by a SQL query which basically combines three things: the schema of the result (the SELECT clause of the statement), the relevant part of the subschema of the source (roughly—the FROM clause of the statement) and the transformation that allows generating the result schema from the source schema (the WHERE clause).

The disclosed mapping format has the same three parts, but are clearly separated (as in XSD, Mapping, RSD).

Mapping is a complex cross-domain view. Mapping allows creating cross-domain views. A distinguishing feature (from, e.g., SQL views or XSLT views) is that its source and target schemas may belong to different data model domains. Mapping can build hierarchical views (XML) on top of relational schemas, or graph views (Object) on top of hierarchical schemas, etc.

The disclosed mapping architecture provides the capability to use other languages such as XQuery and XSLT in combination with mapping to transform the target or source domain. Transformations would be added per operation to the map, for example. Example operations are Insert, Update, Delete, and Query.

Sample coding:

```
<Map Source="Customers" Target="Cust" >
    <FieldMap SourceField="cid" TargetField="CustomerID"/>
    <FieldMap SourceField="street" TargetField="st"/>
    <FieldMap SourceField="zip" TargetField="zip"/>
<MapTransform TransformLanguage="XQuery"
TransformLocation="myxquery.xqr" Operation="Query"/>
</Map>
```

TransformLanguage is a language used to transform the data being mapped. TransformLocation is a file location on a disk or the Internet where the transformation is supplied. If no location is specified, the transformation can be supplied in the text of the MapTransform element. Operation is the operation for which this transform is defined based on the application using the mapping.

Mapping can create complex views with structural transformations on the data. It can create or collapse hierarchies, move attributes from one element to another and introduce new relationships. The result (target schema) of the mapping can be a complex schema. This is in contrast to a conventional architecture that basically transforms a multi-table database schema to a single table. Mapping can produce multiple tables (elements, etc.) related with relationships on the output.

Mapping defines a view, which means that in order to use it, a user may run queries and updates on top of the view. Mapping is not an operation and cannot be used to generate some data without a query or update operation on it. A query, however, may be a trivial one (e.g., sql:view("filename")) and retrieve all the data described by the mapping view (materialize this view). Mapping supports (with some exceptions) both queries and updates against its view (updateable views).

Technically speaking, mapping is similar to a query. The same way SQL View is defined via a query, mapping also implies that there is a query that generates this view. Mapping defines a static reusable updateable view, and users can then use this view to pose multiple ad-hoc queries/updates on top of this view.

For example, a user may use the disclosed mapping Format to define a view (schema) of all customers that had orders in the last seven days (called "Active Customers") with associated orders and order details. The user will then use this view to run queries on top of it. In one domain, for example, an XQuery may be posed that retrieves all "Active Customers" with negative balances. At the execution step, the mapping processor exposes the mapping information which when combined with the XQuery statement will be used by the SQLGen engine to compose a query that corresponds to the relevant parts of the mapping, similar to what SQL Server does for SQL Queries on top of relational views.

Retrieve and update operations are inherently different. A single retrieve operation is supported going one way, while three operations (insert, update, and delete) are supported going the other way going the other way. For example, define a mapping that allows mapping data in SQL Server as a source to a target XML schema to produce XML views of relational data. XQueries cannot be run against tables in the SQL Server. Moreover, the same mapping cannot be used to represent relational views on top of the XML data source. The disclosed mapping format is not symmetrical and cannot be easily reversed. Data can be retrieved from the SQL Server as XML, it can be queried with XML query languages. Updates can also be performed through the same mapping, since mapping supports updates through its view.

Mapping provides the necessary information to apply bidirectional (Read and Write) transformation between the two mapped models. The information needed to perform query, update, insert and delete operations across data model domains are: existence (the existence of a structure in one domain is based on the existence of a structure in the other domain, when these domains are synchronized); copy (copy data between mapped fields in the source and the target models, where the copy operation may include limited transformation on the value from one domain to another, e.g., null values and data type conversions; and relationship map (a map relationship that exists between two mapped structures in the target domain to a relationship between the respective mapped structures in the source domain. Mapping between relationships enables parallel navigation in the two data models, i.e., moving from one structure to another based on a certain relationship in one domain, translates to moving between the two mapped structures in the other domain.

Relationship map is a concept that is less intuitive than the existence or copy semantics. Relationship map is needed to be able to "walk the graphs" in both mapped domains at the same time. If two mapped structures from the target model (e.g., Object, XML) have a relationship between them, or that one target structure is mapped to more then one source structure (e.g., in a table), the implicit or explicit relationship in the target domain must be mapped to the matching relationship in the source (e.g., relational) domain. Note that the requirement that every relationship in the target domain must be mapped to the relationship in the source domain and not the opposite, stems from the target domain being a view over the source domain. Thus the mapping requires the minimal information needed to create this view. The source domain may contain many more structures (tables) and relationships that are not relevant to mapping.

A relationship between structures in the domain can be either a referential relationship (where a type has a reference to another type and deleting/updating one type does not cascade to the other type, only the reference is eliminated) or ownership (Composite) (a relationship where a structure owns another structure and operations on one instance of a structure cascade to an instance of the related structure). For example, deleting a specific customer deletes its orders, however deleting order details does not delete the product.

Any specific mapping applies for both read and write operations. Thus the mapping is considered to be updateable (bi-directional). In order to specify different behavior (for example, read-only or writing one target structure to multiple table scenarios), users can take advantage of the extensibility mechanism of each domain. For example, the relational domain exposes a CustomTable that has query, update, insert, and delete command where a user can specify any SQL statement to be executed when this command is called based on the mapping. Another example is a ReadOnly flag on columns and tables in the relational domain. Trying to update such columns or tables will result in an error, however this information is specified in the domain and not in the mapping.

Figure 4:
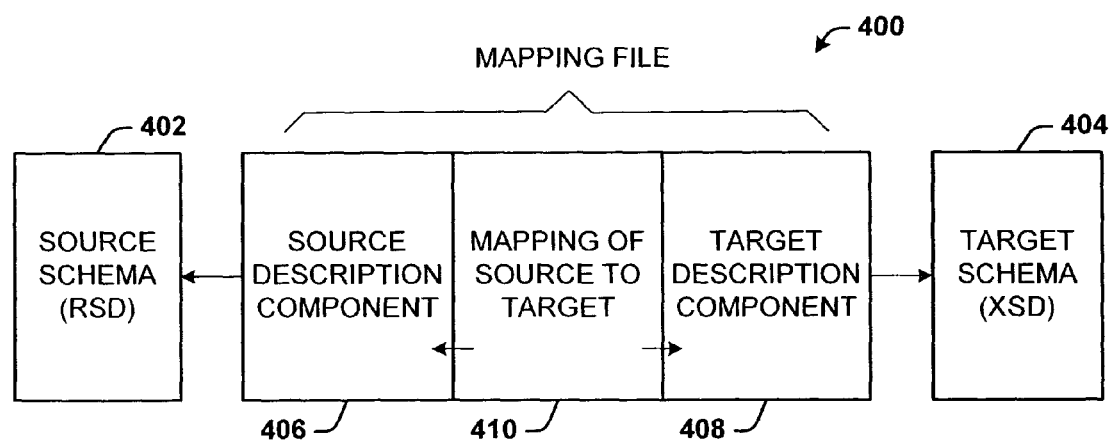
FIG. 4 illustrates a general example of a mapping file for mapping a source schema to a target schema.

Referring now to FIG. 4, an example of mapping a source relational schema to a target XML schema using a mapping file 400. In accordance with aspects of the present invention, neither the source schema 402 nor the target schema 404 need to be modified in any way in order to perform the mapping. Thus, both the source relational schema 402 and target XML schema 404 can be read-only, since no editing of either is required. This feature of the present invention is significant, since in application many client data models will not allow editing to perform a mapping.

The disclosed mapping format can be viewed as consisting of at least three or more components: a source description component 406 for defining the schema of the source data source 402 along with information missing in the source data source 402; a target description component 408 for defining the schema of the target data source 404 along with information missing in the target data source 404, and a central mapping component 410. The source description component 406 extends the relational source schema 402, the target description component 408 extends the XML target schema 404, and the central mapping component 410 performs the actual mapping.

The task then is to define a mapping between these two schemas (402 and 404) to be able to query the relational database to produce XML data in the format defined by the XSD of the target schema 404, and in the other direction, to be able to accept XML data as a source, and load it into the relational tables shredding the XML data into relational data according to the mapping.

One problem that may exist conventionally when defining a mapping is the incompleteness of data source schemas. For example, the relational schema may be missing some of the relationships that do in fact exist in the database. It is unfortunately a common practice for database designers not to define relationships formally as a primary key (PK)-foreign key (FK) constraint. Although the foreign key itself is present in the child table, it is not marked as such in the schema. In the disclosed mapping architecture, however, the primary/foreign key relationship is preferable, so it needs to be defined. Another common case is when a primary key is not marked for the table, as a primary key.

Sometimes it may be desired to add a custom relationship to the schema. For example, say that all cars with VIN numbers starting with "J" are related to a "Japan" entry in a "Countries" table with a relationship "made in". Since in the worst case scenario the relational schema file is not allowed to be edited, a place is needed in the mapping file 400 to define concepts that are otherwise missing in the schema files.

The source and target description components (406 and 408) correspond hereinbelow to the "DataSource" element.

Mapping Semantics—Relational Model (Domain)

A mappable structure in the relational domain is a custom table (denoted as CustomTable). The custom table is made from a collection of columns/fields and commands. The custom table can represent one of the following physical relational structures: physical table; view; UDF or stored procedure; SQL statement (result set of query); and filtered table (a table where condition as applied on). Note that every database table is a custom table. If a user references database table, mapping creates in the background a custom table transparently. Each custom table has four commands: Query, Update, Insert, and Delete. These commands can be created explicitly by the user or automatically by the mapping engine. If a custom table is based on a database table then it inherits the database table relationships (this does not happen in the opposite direction).

Each time a custom table is mapped, it creates a set of instances (that may be referred to as record set, row set, etc.) in the relationship domain. Mapping creates a new set of instances each time the custom table is mapped, unless the user explicitly identifies that he or she wants to map to a set of instances created in a different map.

Relationship—Relational Domain

A relationship can be defined between any two custom tables. A custom table that is based on a regular table inherits all of the relationships from the base table. This means that user does not need to create a relationship between custom table and any other table (or another CustomTable), since a similar relationship already exists between the base table to the other table. However, it is not an error to create a relationship between custom tables where a similar relationship already exists between the base tables. Creating such a relationship may be redundant and users can reuse the relationship defined on the base table.

Figure 5:
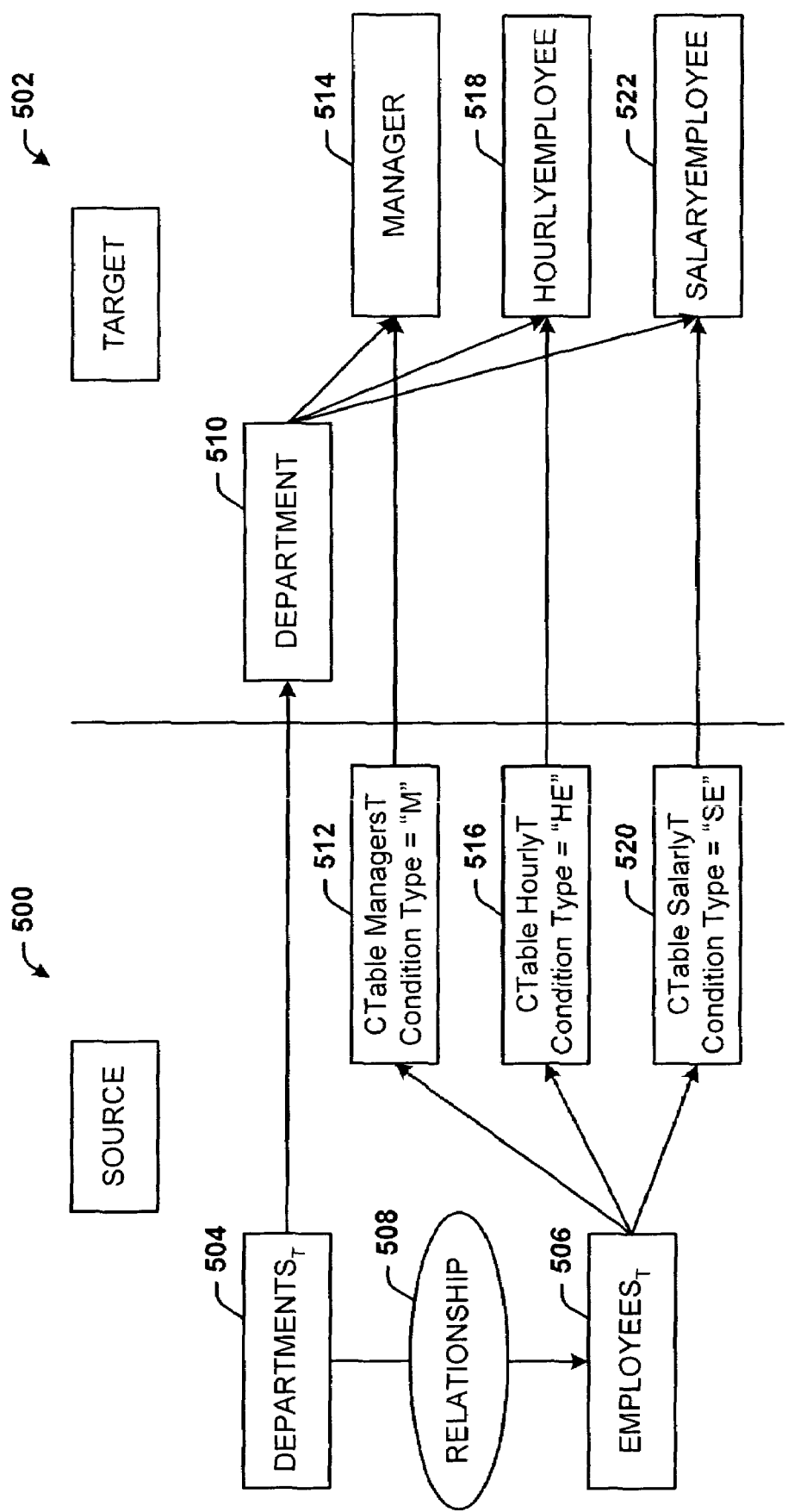
FIG. 5 illustrates a sample mapping between a source domain and a target domain.

One example for inheriting relationships is a single table inheritance case where multiple target structures can be created from the same table based on a column value. Referring now to FIG. 5, consider a mapping between a source domain 500 and a target domain 502. The source domain 500 that includes a Department table 504 and an Employees table 506. A relationship 508 is defined between the Departments table 504 and the Employees table 506. The Employees table 506 has a foreign key from the Departments table 504 such that a similar relationship will be structured in the target domain 502. The Employees table 506 has a column named EmployeeType that stores three values "M", "HE" and "SE". The mapping from the source domain 500 to the target domain 502 is as follows: the Departments table 504 maps to a Department table 510 in the target domain 502; the "M" value 512 maps to a Manager table 514 (M→Manager); the "HE" value 516 maps to an HourlyEmployee table 518 (HE→HourlyEmployee); and the "SE" value 520 maps to a SalaryEmployee table 522 (SE→SalaryEmployee). Due to the foreign key relationship 508 in the source domain 500, the Department table 510 of the target domain 502 links to the Manager table 514, HourlyEmployee table 518, and the SalaryEmployee table 522.

A foreign key is a column or combination of columns used to establish and enforce a link between the data of a source table and a target table. The link is created between the source table and the target table by adding to the target table the column or columns in the source table that hold primary key values. These column(s) then become a foreign key in the target table.

In the example of FIG. 5, since three custom tables CTable (512, 516, and 520) inherit the relationship 508 from the Departments table 504 to the Employees table 506, there is no need to create an explicit relationship between these custom tables (514, 518, and 522) and the Departments table 504, although it is possible and it is not an error to do so. The relationship 508 on the base table (Employees 506) is shared by a custom table (for example, custom table 514), such that user can then define more relationships between that custom table 514 to another table.

The following rules explain how a relationship is shared for custom tables that are based on tables. If a map exists between a physical table and a custom table, and a relationship is referenced between the two, then a relationship between the custom table and the table is considered valid as is a relationship between the physical table and the physical table that the custom table is based on. Note that the opposite does not work, i.e., if two custom tables have a relationship, the physical tables that these custom tables are based on, do not share this relationship. If a map is between two custom tables, then the relationship referenced can be between custom table1 and custom table2, or custom table1 and a base table of custom table2, or base table of custom table1 and custom table2, or between the two base tables.

The relationship in the relational domain is defined using a relationship element in the RSD (Relational Schema Definition). The relationship can be based on physical a foreign key constraint defined in the database or a new definition of relationship for mapping needs. Each relationship must have a unique name so it can be referenced unambiguously. Consider the following example.

```
<re:Relationship name= "Cust_Ord" From= "Customers"
    To= "Orders"
CascadeDelete= "Server">
    <re:ColumnJoin Column= "id" RelatedColumn="customerid"/>
<re:Relationship>
```

Since the relationships are explicitly referenced by name, the relational domain can have multiple relationships defined between the same pair of tables where the differentiation is that each relationship has a different set of ColumnJoins. The relationship element provides all the needed information for the mapping engine to perform the following operations in the relational domain: join between a custom table for the query operation; whether to cascade update operations across the related custom tables; order of the update operation (from which table to delete first, etc.); and validation that the update operation matches the cardinality of the relationship.

Mapping Semantics—Object Domain

The object domain exposes types (classes) as mappable structures for mapping. Type can be identified globally or locally based on path expression. For example, Target="Address" means the global class "Address" while Target="Customer/Address" means the Address class that is a field of the Customer class. Each type (either global or local) can be directly mapped to one and only one custom table in the relational domain (using the Map element). Type can have members of another type, which means that it is referencing an instance of that type that was created based on the type mapping. The reference is created based on the object relationship information.

The semantics of object domain type mapping means that a maximum of one instance of a type in the object domain will be created for existing instances of the mapped set in the source domain, and an unlimited number of references can be created to that type based on the relationship information in the object domain. To illustrate this point consider customer and address classes, where the customer has a member called "MyAddress" which is of the address class type. The customer class is mapped to the customer table and the address class is mapped to the address table. When the user issues a query through mapping to retrieve the "Address" class a new instance of this class is created based on the query criteria, unless an Address object with the same identity already exists. When the user issues another query to retrieve a "Customer" class and the span includes the "MyAddress" property, a new Address object will be created for the "MyAddress" member only if the instance does not exist already in the object store. First, this instance will be added to the "Address" object collection which is managed by the objectspace context (the object domain). Then the "MyAddress" field will be updated with a reference to that "Address" instance.

Mapping Semantics—XML Model (Domain)

The XML domain exposes elements as mapping structures and, elements and attributes as mapping fields. The type definition in the XML schema is ignored and not considered to be a mapping structure, for the following reasons. The XML schema provides both named types and anonymous types. In order to map anonymous types, a user needs to identify them by using the path expression. In the XML domain a new copy is created for any occurrence of a type in the document. The reason is that unlike the object domain, the XML domain does not have an XML document store that manages the XML data based on its type, and creates a reference to an instance of a type that was already been created. In order to enable such XML cache to be such a store, mapping the XML domain requires adding additional metadata to clearly define types when they are not clearly based on the XML schema.

The type names and element names are in two different value spaces such that there is a way in mapping to differentiate between a type name to an element name.

A subset of XPath over the XSD schema is used to identify an instance that can be mapped. The mapping syntax supports type based mapping in the object domain as well as mapping in the XML domain.

Mapping Elements and Attributes

The syntax of mapping is designed to support the design and principals of mapping laid out in the mapping design section. The format of the mapping schema was chosen to be XML. XML format allows the mapping customers to use the XML API to create and maintain mapping files, it is more human readable and mapping engines can use XML schema to perform validation of the mapping file.

The following illustrates a full mapping example of mapping Customers-Orders of one or more elements and attributes.

```
<m:MappingSchema XMLns:m="http://www.microsoft.com/mapping/msd">
    <m:DataSources>
        <m:DataSource Name="Nwind" Default="Northwind">
            <m:InlineSchema>
                <r:Databases XMLns:r="http://www.microsoft.com/mapping/rsd">
                    <r:Database Name="northwind">
                        <r:Schema Name="dbo">
                            <r:Tables>
                                <r:Table Name="Customers">
                                    <r:Columns>
                                        <r:Column Name="CustomerID">
                                            <r:DbStringType Name="nchar" Length="5"/>
                                        </r:Column>
                                        <r:Column Name="CompanyName">
                                            <r:DbStringType Name="nvarchar" Length="40"/>
                                        </r:Column>
```

-continued

```xml
                                <r:Column Name="City">
                                    <r:DbStringType Name="nvarchar" Length="15"/>
                                </r:Column>
                            </r:Columns>
                            <r:Constraints>
                                <r:PrimaryKey Name="PK_Customers">
                                    <r:ColumnRef Name="CustomerID" />
                                </r:PrimaryKey>
                            </r:Constraints>
                        </r:Table>
                        <r:Table Name="Orders">
                            <r:Columns>
                                <r:Column Name="OrderID" AutoIncrement="true">
                                    <r:DbNumericType Name="Int"/>
                                </r:Column>
                                <r:Column Name="CustomerID">
                                    <r:DbStringType Name="nchar" Length="5"/>
                                </r:Column>
                                <r:Column SqlType="datetime" Name="OrderDate">
                                    <r:DbDateType Name="datetime"/>
                                </r:Column>
                                <r:Column SqlType="nvarchar" Length="15" Name="ShipCity">
                                    <r:DbStringType Name="nvarchar" Length="15"/>
                                </r:Column>
                            </r:Columns>
                            <r:Constraints>
                                <r:PrimaryKey Name="PK_Orders">
                                    <r:ColumnRef Name="OrderID" />
                                </r:PrimaryKey>
                            </r:Constraints>
                        </r:Table>
                    </r:Tables>
                    <r:Relationships>
                        <r:Relationship Name="FK_Cust_Order" From="Customers" To="Orders" CascadeDelete="true" CascadeUpdate="true" ForeignKey="true" Cardinality="OneToMany">
                            <ColumnJoin Column="CustomerID" RelatedColumn="CustomerID"/>
                        </r:Relationship>
                    </r:Relationships>
                </r:Schema>
            </r:Database>
        </r:Databases>
    </m:InlineSchema>
</m:DataSource>
<m:DataTarget Type="XML">
    <m:InlineSchema>
        <xsd:schema XMLns:xsd="http://www.w3.org/date/XMLSchema">
            <xsd:element name="Customer">
                <xsd:complexType>
                    <xsd:sequence>
                        <xsd:element name="Order">
                            <xsd:complexType>
                                <xsd:attribute name="customerID" type="xsd:string" />
                                <xsd:attribute name="orderid" type="xsd:int"/>
                                <xsd:attribute name="orderDate" type="xsd:dateTime"/>
                                <xsd:attribute name="shipCity" type="xsd:string"/>
                            </xsd:complexType>
                        </xsd:element>
                    </xsd:sequence>
                    <xsd:attribute name="customerID" type="xsd:string" />
                    <xsd:attribute name="name" type="xsd:string" />
                    <xsd:attribute name="city" type="xsd:string" />
                </xsd:complexType>
            </xsd:element>
        </xsd:schema>
    </m:InlineSchema>
</m:DataTarget>
</m:DataSources>
<m:Mappings>
    <m:Map Source="Customers" Target="Customer">
        <m:RelationshipMap Source="FK_Cust_Order" Target="Order"/>
        <m:FieldMap SourceField="CustomerID" TargetField="customerID"/>
        <m:FieldMap SourceField="CompanyName" TargetField="name"/>
        <m:FieldMap SourceField="City" TargetField="city"/>
    </m:Map>
    <m:Map Source="Orders" Target="Customer/Order">
        <m:FieldMap SourceField="OrderID" TargetField="orderID"/>
        <m:FieldMap SourceField="CustomerID" TargetField="customerID"/>
        <m:FieldMap SourceField="OrderDate" TargetField="orderDate"/>
```

-continued

```
            <m:FieldMap SourceField="ShipCity" TargetField="shipCity"/>
        </m:Map>
    </m:Mappings>
</m:MappingSchema>
```

Assuming that the object schema are mapped where Customer and Order are classes and Customer class has property MyOrders and Order class has a property MyCustomer, the mapping section will change as follows:

```
<m:Mappings>
    <m:Map Source="Customers" Target="Customer">
        <m:RelationshipMap Source="FK_Cust_Order" Target=
        "MyOrders"/>
        <m:FieldMap SourceField="CustomerID" TargetField=
        "customerID"/>
        <m:FieldMap SourceField="CompanyName" TargetField=
        "name"/>
        <m:FieldMap SourceField="City" TargetField="city"/>
    </m:Map>
    <m:Map Source="Orders" Target="Order">
        <m:RelationshipMap Source="FK_Cust_Order" Target=
        "MyCustomer"/>
        <m:FieldMap SourceField="OrderID" TargetField=
        "orderID"/>
        <m:FieldMap SourceField="CustomerID" TargetField=
        "customerID"/>
        <m:FieldMap SourceField="OrderDate" TargetField=
        "orderDate"/>
        <m:FieldMap SourceField="ShipCity" TargetField=
        "shipCity"/>
    </m:Map>
</m:Mappings>
```

MappingSchema Element

MappingSchema is the root element of the mapping schema. It must contain the Mappings and DataSources elements to be valid. MappingSchema can be segmented based on the metadata segmentation rules. Mapping format is an XML document. It has a single root element: MappingSchema. The mapping file contains descriptions of source and target data sources, the mapping between them, and a number of definitions of parameters that can be passed to the mapping schema. Thus the root element has a MappingParameters, a DataSources and Mappings sub-elements in it. The mapping schema without any DataSources or Mappings sub-elements is still a valid mapping schema. The behavior of executing queries and updates against such mapping schema is determined by the specific implementation that uses the schema. Users should typically define all namespaces on this element. There are no attributes on this element. The order of these sub-elements is important, and should be ordered as in the table below.

| Tag | Card | Comment |
| --- | --- | --- |
| MappingParameters | 0-1 | Describes parameters to the entire mapping, contains the Mapping Parameter elements, and can be empty. |
| DataSources | 0-1 | Contains descriptions of all data sources(DataSource and DataTarget) being mapped by this mapping |
| Mappings | 0-1 | Defines all the mappings between data sources |

EXAMPLES

```
<m:MappingSchema xmlns:m=
"http://www.microsoft.com/mapping/msd">
    <m:MappingParameters>...</m:MappingParameters>
    <m:DataSources>...</m:DataSources>
    <m:Mappings>...</m:Mappings>
</m:MappingSchema>
<m:MappingSchema>
    <m:MappingParameters>
        <m:MappingParameter>
        ...
        </m:MappingParameter>
        ...
    </m:MappingParameters>
    <m:DataSources>
        <m:DataSource name="foo">
        ...
        </m:DataSource>
        <m:DataTarget Type="XML">
        ...
        </m:DataSource>
    </m:DataSources>
    <m:Mappings>
        <m:Map>
        ...
        </m:Map>
    </m:Mappings>
</m:MappingSchema>
```

DataSource Element

The DataSource element holds the schema information of the mapped data source.

The data source can contain multiple schema files which represent different segments of the schema. This element represents a virtual SQL server.

Attributes:

| Tag | Card | Comment |
| --- | --- | --- |
| Name | Req | The name of this DataSource. The name can be used by an external API that uses mapping to associate the data source with external resources such as connection for the relational domain. |
| Default | Opt | The name of a default identifier passed to the source domain. For example, the name of the default database in a given RSD. |

Sub-elements:

| Tag | Card | Comment |
| --- | --- | --- |
| Schema | 0+ | Points to the domain schema through its @Location attribute. |
| InlineSchema | 0-1 | Contains in line the source domain schema. |

Either the Schema element or InlineSchema element must be present, but only one of them. For an example, see the mapping file. The Schema/InlineSchema elements must point to a valid RSD.

DataTarget Element

This element holds the schema information of the mapped target domain. The extensions element provides the ability to add information to the domain schema. This is useful in cases where the schema cannot be edited, or the schema was not created specifically for mapping. The target schema may be segmented.

Attributes:

| Tag | Card | Comment |
|---|---|---|
| Type | Req | The type of the Target domain. At least XML and OBJECT is supported. |

Sub-elements:

| Tag | Card | Comment |
|---|---|---|
| Schema | 0+ | Points to the domain schema through its @Location attribute. |
| InlineSchema | 0-1 | Contains inline the target domain schema. |

It is an error to have the segments of target domain schema from different domains, e.g., mixing XML schema and Object schema is an error.

For an example, see the mapping file example.

Schema Element

The Schema element is used in the DataSource element to define the schema of the data source. The schema can be defined inline or in a separate file. If a schema is defined in a separate XSD, RSD, etc., file (which will be the case in most scenarios), then the Schema element should be used. The InlineSchema element is used to define the schema inline (contained in the body of the Schema element) in the namespace of the schema domain (XSD for XML data source, etc.). There are no sub-elements of this element. The following attributes are noted.

| Tag | Card | Comment |
|---|---|---|
| Location | Req | This attribute is a URL to the file defining the schema of the data source (XSD for XML, RSD for relational Databases, OSD for Objects). |

EXAMPLE

```
<m:DataSource Name="NorthWindXML" Direction="Target" Type="XML">
    <m:Schema Location="NorthWind.xsd"/>
</m:DataSource>
```

InlineSchema Element

The Schema element is used in the DataSource element to define the schema of the data source. The InlineSchema element is used to define the schema inline (contained in the body of the Schema element) in the namespace of the schema domain (XSD for XML data source, etc.). There are no attributes on this element. There are no sub-elements on this element. The body of this element contains a schema definition (XSD, RSD or OSD).

EXAMPLES

```
<m:DataSource Name="NorthWindSQL" Direction="Source" Type="SQL Server">
    <m:InlineSchema XMLns:r="http://www.microsoft.com/data/rsd">
        <r:Database name="NW">
            <r:Tables>
                <r:Table Name="Customers">
                    <r:Columns>
                        <r:Column Name="CompanyName" DataType="nvarchar" Precision="40"/>
                        <r:Column IsNullable="true" Name="ContactName" DataType="nvarchar" Precision="30"/>
                        <r:Column Name="CustomerID" DataType="nchar" Precision="5"/>
                    </r:Columns>
                    <r:Constraints>
                        <r:PrimaryKey Name="PK_Customers">
                            <r:ColumnRef Name= "CustomerID"/>
                        </r:PrimaryKey>
                    </r:Constraints>
                </r:Table>
                <r:Table Name="Orders">
                    <r:Columns>
                        <r:Column IsNullable="true" Name="OrderDate" DataType="datetime"/>
                        <r:Column IsNullable="true" Name="Freight" DataType="money"/>
                        <r:Column IsNullable="true" Name="CustomerID" DataType="nchar" Precision="5"/>
                        <r:Column Identity="true" Name="OrderID" DataType="int" Increment="1" Seed="1"/>
                    </r:Columns>
                    <r:Constraints>
                        <r:PrimaryKey Name="PK_Orders">
                            <r:ColumnRef Name="OrderID"/>
```

-continued

```
            </r:PrimaryKey>
            <r:ForeignKey ForeignTable="Customers" Name="FK_Orders_Customers">
                <r:ColumnMatch ForeignName="CustomerID" Name="CustomerID"/>
            </r:ForeignKey>
          </r:Constraints>
        </r:Table>
      </r:Tables>
     </r:Database>
   </m:InlineSchema>
</m:DataSource>
```

RelationshipMap Element

RelationshipMap is a child element of the Map element that provides the information of how to map Relationships in the Source and Target domain. It is needed in order to identify which relationship to use when moving from one structure to another in both target and source domains. This section provides the description of the syntax, semantics and validation of this element in the mapping schema. Reader should be familiar with the RelationshipMap concept. The RelationshipMap element is required when a relationship exists in the target domain between two mapped structures that are mapped to different source structures ("Mapped structures" means structures that were mapped using the "Map" element). Examples for such relationships are a Field/property of an object that its type is mapped in another map (Object), and Mapped XML element which is a child of another mapped XML element (XML).

Note that the RelationshipMap must match the Source and Target for both related maps. The following demonstrates how this process works: a relationship exists between two target structures (see examples above); these two target structures are mapped by two Maps (two Map elements); and the applicable Sources on these Maps have a valid relationship specified as the Source in the RelationshipMap.

Note that other types of relationships in the target domain, such as inheritance or fields that are mapped to another source, are handled through different mapping attributes (BasedOnRelationship for inheritance and SourceRelationship for fields on FieldMap).

Although in some cases the mapping engine can infer the RelationshipMap by identifying a relationship in the target domain and finding the matching relationship in the source domain (between the mapped sources (tables)), the RelationshipMap is required to be explicit for two reasons. First, explicit RelationshipMap means that adding relationship to the RSD will not break mapping. If the mapping engine infers the RelationshipMap and a Relationship is added to the RSD it can break the mapping since the added relationship might be between two mapped tables that use to have a single relationship. After adding the relationship the mapping engine won't know which relationship to pick and will throw an exception. Second, it will be a better usability experience to require users to understand all three simple concepts of mapping, instead of doing "magic" (by inferring the RelationshipMap) and then throwing exception when ambiguous relationship is found as in the example above.

| Tag | Card | Comment |
| --- | --- | --- |
| Source | Req | The identifier for a relationship in the source domain. This is an space separated list. Escaping rules are specified in the RSD spec. |
| Target | Req | The identifier for another mapped structure in the target domain that has a relationship to the parent map target structure. |
| UseForConcurrency | Opt | Default is "Always". |

The Source must be a valid relationship in Source (relational) domain. This validation happens after all segments of the source schema were loaded.

The Target must be a valid structure in the target domain that has relationship to the mapped target. The Target must be a name of a related mapped structure in the target domain. It is an error to specify a name for a structure (Type, Element) that is not mapped in another map or does not have a relationship to the Target on the parent Map. In the XML domain the Target must be a child of the element which is the Target on the parent map. Parent map refers to the Map that the RelationshipMap is contained in. This validation happens on the mapping cache.

In a list of relationships the Source of the parent Map must be either the "From" or the "To" of the first Relationship in the list. This rule ensures that the first relationship includes the Source of the parent Map. This validation happens on the mapping cache.

In a list of relationships the Source of the Map of the related Target must be the "From" or the "To" of the last relationship in the list. This rule ensures that the last relationship includes the Source of the related map. This validation happens on the mapping cache.

If Source is a list of relationships that list must be ordered. In each relationship either the "From" or the "To", must match the "From" or the "To" in the next relationship. This rule ensures that the Join/Where clause constructed from the relationship is always valid, as it is not appropriate to have join clause where tables are not joined to each other. This validation happens on the mapping cache.

The relationship between two mapped target structures must be mapped. Any two mapped target structures that have a relationship defined in the target domain which are mapped to source structures through the Source attribute must have a RelationshipMap. A relationship to a target structure that is mapped to a source structure through the "Ref" attribute does not require mapping of that relationship. This validation happens using the following algorithm:

```
For each mapped target structure get all relationships to other
target structures.
{
For each related target structure
{
IF (
The related target structure is mapped
And (apply only to XML domain, please ignore for Object)
The related structure is a child element and the current target
structure map does not mapped using the "Ref" attribute.
Validate that a valid RelationshipMap based on the validation
rules above exists.
}
}
```

Note that the definition of related targets depends on the target domain semantics. This validation happens on the mapping cache.

The CascadeDelete value of the mapped relationships must match (apply only for object domain). The allowable matrix for matching values is as follows.

| Source | Target | Valid |
|---|---|---|
| Server | True not specified | Yes |
| Explicit | True not specified | Yes |
| Never | False not specified | Yes |

Any other combination is an error. This validation happens on the mapping cache.

The cardinality value of the relationships must match, and is indicated in the following table.

| Source | Target | Valid |
|---|---|---|
| OneToOne | OneToOne in the Object domain | Yes |
| OneToMany | Any cardinality that is one to more than one | Yes |

Any other combination is an error. This validation happens on the mapping cache. For example, see the canonical example.

Map Element

The semantics of the Map element is that existence of an instance of a mapped structure from the source domain implies that an instance of the mapped target structure must exist in the target domain. In a Read operation, an instance of the structure in the target domain is created for every instance that exists in the source domain. In the Write operation, the operation is translated on an instance in the Target domain to an equivalent operation on an existing instance in the Source domain. Consider, for example, a mapping between the Customers table to the customer object or element using a Map element. The semantics of such Map is that a Customer Object will be created for every row in the Customer table. Deleting such customer object will result in deleting exactly one row in the customer table, creating new customer object will result in inserting one row to the customers table, similar logic apply for updating. The extensibility and override mechanism for the existing 1:1 map described above is provided by the CustomTable which are specified in the RSD. It allows for side effects such as inserting another record to some other table then the mapped table. The user can map to such CustomTable that has a command for each type of operation (Retrieve, Insert, Update and Delete) like any other table.

In each command the user can specify the SQL/SP that will be executed by the mapping engine when such a command is called based on the operation preformed in the target domain. This command will be called exactly once for each instance in the target domain (note that all tables are custom tables with auto commands set to true).

The same source structure can be used in multiple maps. Examples are mapping one table to multiple object types (Customers table is mapped to Customer object and CustomerInfo object), or mapping same table to multiple XML elements (Customers table is mapped to Customer top level element and Customer element under the Company element). The semantics of such mapping is that a new set also referred as an iterator is created (using the query command) in the Source domain for every map. The user can use the same set by having the Ref attribute instead of Source.

Attributes:

| Tag | Card | Comment |
|---|---|---|
| Source | Opt | The select expression or name of a structure (CustomTable) in the Source domain (Relational). |
| Target | Req | The select expression for a structure in the Target domain. |
| Name | Opt | The unique name for this map. This is used when user need to reference a map. |
| Ref | Opt | A name of another map. Can be used only for XML-Relational mapping. |
| BasedOnMap | Opt | A name of another map. |
| BasedOnRelationship | Opt | A name of a Relationship in the relational domain. |
| UseForConcurrency | Opt | The concurrency setting for all of the FieldMaps in this map. |

Sub-Elements:

| Tag | Card | Comment |
|---|---|---|
| FieldMap | 0+ | Mapping for the fields of this Variable. |
| OverflowMap | 0-1 | This element is used to map overflow on the target structure to a filed in the Source DataSource. This element is supported only by the XML domain. |
| RelationshipMap | 0+ | The mapping between relationship of the Map's Target structure to another structure and the applicable relationship between the mapped Source structures. |

Target is a valid structure in the DataTarget. It is an error to have a map that points to a target that does not exist in the Target domain. This validation happens on the mapping cache. If Source exists, it must be valid structure in the DataSource. It is an error to have a map that points to a Source that does not exist in the Source domain. This validation happens on the mapping cache.

A target structure can be mapped only once. The rule enables mapping to be updateable, since a Target structure can be mapped only once, any instance of that structure in the target domain can be unambiguously written to the source (relational) domain. If the user would like to map a target structure more then once either in the read or write directions, she can use the Custom table in the source (relational) domain. This validation happens on the mapping cache.

The Map name is unique across the mapping schema. The Map name needs to be unique across the mapping file in order to allow other map to unambiguously reference this map. There are certain functionalities that require referencing exiting Map such as Ref and BasedOnMap. This validation happens on the mapping cache.

The Ref attribute must point to a valid Map. The value of Ref attribute must be a name of an existing valid map in the mapping schema. This validation happens on the mapping cache. Ref and Source attributes are mutually exclusive. Multiple Sources are not allowed on the same map, thus the Ref attribute, which means that this map using Source from another map, cannot exist with Source on the same Map.

The BasedOnRelationship attributes cannot exist without BasedOnMap. The Ref and BasedOnRelationship attributes are mutually exclusive. The Ref attribute points to a Source (iterator) already in scope, thus there is no need to specify a relationship.

field, for example, FreightAmount and FreightCurrency, TaxAmount and TaxCurrency. On update the mapping engine change processor (CP) verifies that the target fields that are updated and mapped to the same source field have the same value.

Multiple FieldMaps with the same source means that the user is referring to the same set (also known as Variable or iterator). This is the simplest and most intuitive behavior and there is not any scenario where a user would want to use a different set for the same relationship. Note that changing the SourceRelationship means a new set, since joining one table to another based on different keys mean creating a new result set. To make it clear and explicit, this behavior semantics is different then the Map semantics where every Source means a new set (iterator over a result set).

| | | Attributes: |
|---|---|---|
| Tag | Card | Comment |
| SourceField | Req | The identifier for a field in the source domain (column for Database) or MappingParameter. |
| TargetField | Req | The identifier for the field (attribute or simple type element for XML, field for Objects) in the Target domain or MappingParameter. |
| Source | Opt | The select expression or name of a structure in the Source domain. If not presented then SourceField is interpreted as a field of the Source of the container Map. |
| SourceRelationship | Opt | The name of the relationship between the Source on the map and the Source of the FieldMap. |
| ReadOnly | Opt | Boolean that specifies that this Field can not be written to the SourceField. The target field will be ignored for any update operation. |
| Ref | Opt | A name of another map. Can be used only for XML-Relational mapping. |
| UseForConcurrency | Opt | The concurrency setting for this FieldMap. |
| NullHandling | Opt | Can get the values of "DomainNull", "Absence" and "UseNullValue". |
| NullValue | Opt | The Null image representation in the Target domain. |
| ForceNullOnInsert | Opt | Boolean that allow explicitly inserting Null to the source domain field (column). |

Ref cannot be used for Object-Relational mapping. The Ref attribute semantics do not apply to the object to relational mapping.

For an example, see the full mapping example hereinabove.

FieldMap Sub-Element

The FieldMap element represents the operation of copying a value from one domain to another. The mapping engines simply copy the value of Source Field to the Target Field on Read and the opposite on write. In some cases these values are coming from a different Source (table), thus the Source/Ref/SourceRelationship attributes provide the needed information of how to get that value. FieldMap allows definition for null value transformation and setting the concurrency options for the write operation.

FieldMap enables for denormalizing data on the target side. A target field (object-field, etc.) can be mapped only once. However, SourceField can be mapped more then once. This is allowed in order to support scenarios where users want to denormalize the data in the target domain. Consider the scenario where Orders Table has one field for CurrencyID while the Order object has a currency field for each amount If the value of SourceField or TargetField start with "$" then the other field (SourceField or TargetField) is mapped to a MappingParameter. If a SourceField is a MappingParameter it means that this is a ReadOnly FieldMap and is not in update operations. SourceField/TargetField validation: the value of these attributes must be resolved successfully to a valid field on the parent Map Source/Target structures respectively or to a Mapping Parameter. If a value of these attribute start with the "$" sign it must be resolved to a declared mapping parameter in the mapping parameters section. This validation happens on the mapping cache.

The Source/Ref/SourceRelationship must be valid in the source domain. The Source must resolve to a valid structure (CustomTable) in the source domain, Ref must be the name of existing map, and SourceRelationship must be a name of a valid relationship in the source domain. This validation happens on the mapping cache.

Ref and (Source/SourceRelationship) are mutually exclusive. Since Ref semantics is Source from a different map. That source has to be in scope so there is no need for SourceRelationship.

If Source exists on the FieldMap, SourceRelationship must be present, since Mapping needs to know what the relationship is between the source of the Map to the Source of the FieldMap.

SourceRelationship cannot be presented if Source does not exist on the FieldMap. If Source does not exist, it means that the SourceField belongs to the parent map source structure. Thus there is no need for relationship information.

Any specific Target Field can be mapped only once. Conceptually, fields in both domains are scalar values, thus copying the value from the SourceField to the TargetField must be unambiguous and can not have any merge semantics.

Both SourceField and TargetField cannot be a mapping parameter. Mapping one MappingParameter to another is meaningless.

UseForConcurrency cannot be specified when the SourceField is MappingParameter. It is not applicable in context of the mapping parameter.

The cardinality value of the SourceRelationship must be compatible with the TargetField type. If the SourceRelationship cardinality is OneToOne the TargetField type must be scalar, otherwise it is an error. If the SourceRelationship cardinality is OneToMany the TargetField type must be list type, otherwise it is an error. (For object mapping this case is not supported). This validation is useful to be able to detect a mismatch at compile time between the type of the target field and the cardinality of the relationship, e.g., if the "oid int" type property on the Customer class is mapped to the orderId column of the Orders table that has a many-to-one Relationship with the Customer class.

Ref cannot be used for Object-Relational mapping. The Ref semantics does not apply to the object to relational mapping. For an example, see the full mapping example.

OverflowMap Sub-Element

This element is always contained in the "Map" element and is used to map Overflow. Overflow is defined as anything in the containing variable that is not explicitly mapped. It is used for XML elements that have unmapped attributes and open content. This element is not applicable for Object mapping thus it is an error to have this element in a mapping schema that maps between relational and object domains.

The Overflow SourceField must contain valid XML document (stored as string) with the Map TargetStructure element as its root element. When using mapping in query the attributes on the root node are added to the TargetStructure element and the sub elements are added as child elements of that element.

When using mapping for write scenario an XML element with the same name as the TargetStructure element is created and the attributes of that element that are either not in the schema or are not mapped are added to the root element. The sub elements that are not mapped or are not in the schema are added as child element of that element including the text content of that element.

A user can query and update into overflow data, this behavior is referred as fusion. Error conditions are:

Query—Having a mapped attribute in the overflow field (that creates duplicate attribute condition).

Query—Having text content for the TargetStructure element mapped and included in the overflow field.

| Attribute: | | |
|---|---|---|
| Tag | Card | Comment |
| SourceField | Req | The name of the field (column for Database) in the Source domain. This name is relative to the containing. The syntax of the field is data source dependent. |

This element does not have any sub-elements.

MappingParameter Element

The semantics of mapping parameter is the ability to map a value that is known at run time to either source or target field. The MappingParameter is declared in the MappingParameters section and can be accessed at run time through the mapping API. The NullHandling settings on the FieldMap apply also to the MappingParameter. A MappingParameter can be used either as a SourceField or a TargetField. The mapping engine will differentiate between them based on the $ prefix in the beginning of the MappingParameter name. (The $ is an illegal character for identifier in all mapped domains: object, XML and Relational (where it can be escaped)). The MappingParameter is untyped, thus its XSD type is string. At run time the mapping engine will convert this value to the type of the mapped field type (either target field or source field).

The text content of this element is the default value of this parameter. This value can be changed at run time by applications that use the mapping such as ObjectSpace, XQueryProcessor, Bulkload and XMLAdapter.

| Attributes: | | |
|---|---|---|
| Tag | Card | Comment |
| Name | Req | The name of the parameter. It must be unique within the mapping file. This is how the parameter will be referenced from the mapping. Name must start with "$". |

If a value of SourceField/TargetField/NullValue begins with "$$", it means that this is not a mapping parameter and the actual value begins with single "$". MappingParameter can be used only as the value of SourceField, TargetField or NullValue. The Mapping engine cannot assign the mapping parameters value based on their field mapping. They are applied and used in the following mapping contexts: MappingParameter is mapped to SourceField it is used for write operations and ignored on read. MappingParameter is mapped to TargetField it is used for read operation and ignored on write. Thus MappingParameter cannot be used as output parameter.

In Bulkload, many times users would like to insert data to their database that is not included in the XSD schema. This data is usually also known only at run time and is not contained as part of the XML document. Examples are userid, machine id, etc.

The user may want to unify the NullValue that is used across the mapping schema. This is done by creating a MappingParameter with a given default value and using this mapping parameter in the value of the NullValue attribute in many FieldMaps.

With respect to validation, the name of MappingParameter must start with the character "$". Any other character will invoke an error. The name cannot begin with "$$" This enables escaping the "$" sign if the user has a valid domain field name that starts with "$", or wants to indicate a null value as a "$".

The name must be unique across the mapping schema to avoid ambiguity when assigning the value of the mapping parameter to the source or target field at run time. Note that the uniqueness of the name is across all loaded segments of the mapping schema.

BasedOnMap—BasedOnRelationship Attributes

A design guideline is that all the necessary mapping information will be provided from the mapping section in the mapping file and not from the domains. Thus in the inheritance and recursion cases the user needs to explicitly provide the information for mapping the recurring element and inherited class fields. The "BasedOnMap" attribute provides users a syntactical shortcut to copy FieldMaps and RelationshipMaps from one Map to another. It enables the mapping engine to get the necessary information to copy FieldMaps and RelationshipMaps in the Object inheritance scenario and in the XML recursion scenario and by keeping the mapping syntax explicit and independent from domains. The BasedOnMap option copies the FieldMaps and RelationshipMaps from the Map whose name is referred as the value of "BasedOnMap" attribute as they are. Copied FieldMaps/RelationshipMaps will be identical to the base ones including the SourceRelationship attribute.

BasedOnRelationship is used in the case where the Source on the Map is different then the Source on the Map where the BasedOnMap is specified. Thus it requires creating and updating all the relevant source information and relationships (SourceRelationship, RelationshipMap). Specifying the BasedOnRelationship attribute adds the Source attribute to the copied FieldMaps with the value of the Source as specified in the base Map and SourceRelationship with the value of the BasedOnRelationship attribute. If the copied FieldMaps already have the Source and SourceRelationship attributes and for any Copied RelationshipMap, these attributes will be updated with the relationship between the source on the new map to the Source on the based on map.

Both BasedOnMap and BasedOnRelationship attributes could be interpreted as macros that allow syntactical shortcuts. Two keywords will be used in the following description and rules: BasedOnMapValue—the value specified by the BasedOnMap attribute; and BasedRelationshipValue—the value specified by the BasedOnRelationship attribute.

The value of BasedOnMap is the Map name to copy the FieldMap from. It simply copies the FieldMaps from the named Map it points to the Map the BasedOnMap is declared. Copy all the child FieldMaps and RelationshipMap elements with all their attributes, from the Map whose name is BasedOnMapValue to the Map element where BasedOnMap attribute is specified.

BasedOnRelationship attribute with BasedOnMap attribute. For every FieldMap element, find and update the relevant FieldMaps. Find all the child FieldMaps elements from the Map whose name is BasedOnMapValue. If the Source attribute exists on the FieldMaps, leave the values as they are, else add Source attribute to the FieldMaps with the value of the Source attribute on the Map element whose name is BasedOnMapValue.

If SourceRelationship attribute exists on the FieldMaps, insert a blank (" ") to the beginning of the SourceRelationship attribute. Insert the BasedRelationshipValue to the beginning of the SourceRelationship, else add SourceRelationship attribute with the value of the BasedRelationshipValue.

Place all the FieldMap elements with the modified Source and SourceRelationship attributes and all their other unchanged attributes as they are into the Map element where BasedOnMap and BasedOnRelationship attributes are specified.

Find all the child RelationshipMap elements from the Map whose name is BasedOnMapValue with keeping all their attributes as they are. For every RelationshipMap element: Insert a blank (" ") to the beginning of the value of the Source attribute. Insert the BasedRelationshipValue to the beginning of the Source attribute. Copy all the RelationshipMap elements with the modified Source attribute and all the other unchanged attributes to the Map element where BasedOnMap and BasedOnRelationship attributes are specified.

The above semantics implies that the following rules apply. BasedOnMap should refer to a valid Map name. BasedOnRelationship should refer to a valid Relationship name in the source domain. A valid BasedOnMap should exist if BasedOnRelationship is specified. Copied FieldMaps are subject to the all other mapping rules as they are explicitly defined.

EXAMPLE

Use of BasedOnRelationship in XML Case

Tables:
Employee (EID, FirstName, LastName, HireDate, Salary, Manager)
FiredEmployee (EID, FirstName, LastName, HireDate, Salary, Manager)

Sample of result in XML:

```
<AllEmployees>
    <GoodEmployee EID="1" FirstName="Good" LastName="Emp" HireDate="1/1/2003" Salary="1,000,000$" />
    <BadEmployee EID="2" FirstName="Bad" LastName="Emp" HireDate="10/10/2000" Salary="10$" />
</AllEmployees>
```

Mapping:

```
<m:Map Name="GoodEmployeeMap" Source="Employee" Target="AllEmployees/GoodEmployee">
    <m:FieldMap SourceField="EID" TargetField="EID"/>
    <m:FieldMap SourceField="FirstName" TargetField="FirstName"/>
    <m:FieldMap SourceField="LastName" TargetField="LastName"/>
    <m:FieldMap SourceField="HireDate" TargetField="HireDate"/>
    <m:FieldMap SourceField="Salary" TargetField="Salary"/>
</m:Map>
<m:Map Source="FiredEmployee" Target="AllEmployees/LazyEmployee" BasedOnMap="GoodEmployeeMap">
</m:Map>
```

Actual Map as it is created in the Mapping engine:

```
<m:Map Name="GoodEmployeeMap" Source="Employee" Target="AllEmployees/GoodEmployee">
    <m:FieldMap SourceField="EIDv" TargetField="EID"/>
    <m:FieldMap SourceField="FirstName" TargetField="FirstName"/>
    <m:FieldMap SourceField="LastName"
```

```
        TargetField="LastName"/>
    <m:FieldMap SourceField="HireDate"
        TargetField="HireDate"/>
    <m:FieldMap SourceField="Salary"
        TargetField="Salary"/>
</m:Map>
<m:Map Source="FiredEmployee"
    Target="AllEmployees/LazyEmployee" >
    <m:FieldMap SourceField="EID" TargetField="EID"/>
    <m:FieldMap SourceField="FirstName"
        TargetField="FirstName"/>
    <m:FieldMap SourceField="LastName"
        TargetField="LastName"/>
    <m:FieldMap SourceField="HireDate"
        TargetField="HireDate"/>
    <m:FieldMap SourceField="Salary"
        TargetField="Salary"/>
</m:Map>
```

Inheritance Across Tables Hierarchy (Object)

Tables:

Persons (SSID, FirstName, LastName)

Employees (EID, EmployeeSSID, HireDate, Salary, Manager)

Managers (EID, Bonus)

```
<Relationship Name="PE" From="Persons" To="Employees">
    <FieldJoin From="SSID" To="EmployeeSSID"/>
</Relationship>
<Relationship Name="EM" From="Employees" To="Managers">
    <FieldJoin From="EID" To="EID"/>
</Relationship>
<Relationship Name="MyManager_R" From="Employees"
To="Employees">
    <FieldJoin From="EID" To="Manager"/>
</Relationship>
<Relationship Name="MyEmployees_R" From="Managers"
To="Employees">
    <FieldJoin From="EID" To="Manager"/>
</Relationship>
```

Inheritance Hierarchy: Person→Employee→Manager

Mapping:

```
<m:Map Name="PersonMap" Source="Persons"
    Target="Person">
        <m:FieldMap SourceField="SSID"
            TargetField="SSID"/>
        <m:FieldMap SourceField="FirstName"
            TargetField="FirstName"/>
        <m:FieldMap SourceField="LastName"
            TargetField="LastName"/>
</m:Map>
<m:Map Name="EmployeeMap" Source="Employees"
    Target="Employee"
BasedOnMap="PersonMap" BasedOnRelationship="PE">
        <m:FieldMap SourceField="EID"
            TargetField="EmployeeID"/>
        <m:FieldMap SourceField="HireDate"
            TargetField="HireDate"/>
        <m:FieldMap SourceField="Salary"
            TargetField="Salary"/>
        <m:RelationshipMap Source="MyManager_R"
            Target="myManager"/>
</m:Map>
<m:Map Source="Managers" Target="Manager"
    BasedOnMap="EmployeeMap"
BasedOnRelationship="EM">
        <m:FieldMap SourceField="Bonus"
            TargetField="Bonus"/>
        <m:RelationshipMap Source="MyEmployees_R"
            Target="myEmployees"/>
</m:Map>
```

Actual Map as it is created in the Mapping engine:

```
<m:Map Name="PersonMap" Source="Persons" Target="Person">
        <m:FieldMap SourceField="SSID" TargetField="SSID"/>
        <m:FieldMap SourceField="FirstName" TargetField=
            "FirstName"/>
        <m:FieldMap SourceField="LastName" TargetField=
            "LastName"/>
    </m:Map>
<m:Map Name="EmployeeMap" Source="Employees" Target=
"Employee" >
    <m:RelationshipMap Source="MyManager_R" Target=
        "myManager"/>
    <m:FieldMap SourceField="EmployeeID" TargetField=
        "EmployeeID"/>
    <m:FieldMap SourceField="HireDate" TargetField=
        "HireDate"/>
    <m:FieldMap SourceField="Salary" TargetField="Salary"/>
    <m:FieldMap Source="Persons" SourceRelationship="PE"
        SourceField="SSID"
TargetField="SSID"/>
    <m:FieldMap Source="Persons" SourceRelationship="PE"
SourceField="FirstName"
TargetField="FirstName"/>
    <m:FieldMap Source="Persons" SourceRelationship="PE"
SourceField="LastName"
TargetField="LastName"/>
</m:Map>
<m:Map Source="Managers" Target="Manager">
    <m:RelationshipMap Source="MyEmployees_R" Target=
        "myEmployees"/>
    <m:RelationshipMap Source="EM MyManager_R" Target=
        "myManager"/>
    <m:FieldMap SourceField="Bonus" TargetField="Bonus"/>
    <m:FieldMap Source="Employees" SourceRelationship="EM"
SourceField="EmployeeID" TargetField="EmployeeID"/>
    <m:FieldMap ="Employees" SourceRelationship="EM"
        SourceField="HireDate"
TargetField="HireDate"/>
    <m:FieldMap ="Employees" SourceRelationship="EM"
        SourceField="Salary"
TargetField="Salary"/>
    <m:FieldMap Source="Persons" SourceRelationship="EM PE"
SourceField="SSID"
TargetField="SSID"/>
    <m:FieldMap Source="Persons" SourceRelationship="EM PE"
SourceField="FirstName"
TargetField="FirstName"/>
    <m:FieldMap Source="Persons" SourceRelationship="EM PE"
SourceField="LastName"
TargetField="LastName"/>
</m:Map>
```

Inheritance Using Same Base Table (Different Custom Table) Example (Object)

RSD:

```
<CustomTable Name="Employees" >
<BasedOn Name="People" AutoCommands="true"/>
<QueryCommand>
<Condition LeftField="TypeIdentifierColumn" Operator="EQUAL" RightConstant= "E"
/>
</QueryCommand>
</CustomTable>
<CustomTable Name="Managers" >
<BasedOn Name="People" AutoCommands="true"/>
<QueryCommand>
<Condition LeftField="TypeIdentifierColumn" Operator="EQUAL" RightConstant= "M"
/>
</QueryCommand>
</CustomTable>
```

MAP:

```
<m:Map Name="EmployeeMap" Source="Employees" Target="Employee" >
<m:FieldMap SourceField="NAME" TargetField="name" />
<m:FieldMap SourceField="SALARY" TargetField="salary" />
</m:Map>
<m:Map Source="Managers" Target="Manager" BasedOnMap="EmployeeMap">
<FieldMap SourceField="BONUS" TargetField="bonus" />
</m:Map>
```

Which means:

```
<m:Map Source="Managers" Target="Manager" >
<m:FieldMap SourceField="NAME" TargetField="name" />
<m:FieldMap SourceField="SALARY" TargetField="salary" />
<FieldMap SourceField="BONUS" TargetField="bonus" />
</m:Map>
```

NullHandling Attributes

The value NULL means the data value for the column is unknown or not available. NULL is not synonymous with zero (numeric or binary value), a zero-length string, or blank (character value). Rather, null values allow distinguishing between an entry of zero (numeric columns) or blank (character columns) and a nonentry (NULL for both numeric and character columns). No two null values are equal. Comparisons between two null values, or between a NULL and any other value, return unknown because the value of each NULL is unknown. Null values usually indicate data that is unknown, not applicable, or to be added at a later time. For example, a customer's middle initial may not be known at the time the customer places an order. Mapping Null is a complex task because the value is unknown, and each domain expresses that concept (Null) differently. Sometimes it can even be expressed in several different ways, for example, the XML domain can express Null as xsi:nil, absence or empty list, and the object domain has nullable types, and SQL types, which is DBNull. In addition, the user may want to choose a value in the Target domain that represents Null, that value is often referred as Null image.

The NullHandling attributes provide the capability to transform Null from the source domain to a null representation in the target domain and the other way around (from a value in the target domain to null in the source domain).

| Attribute Name | Type | Card | Values | Comments |
| --- | --- | --- | --- | --- |
| NullHandling | xsd: string | Optional | 'DomainNull' 'Absence' 'UseNullValue' | Apply to Read and Write scenarios. |
| NullValue | xsd: string | Required when NullHandling value is 'UseNullValue' else should be absent. | Supplied by user | The Null value should be locale aware. |
| ForceNullOnInsert | xsd: Boolean | Optional | true/false | Default = false |

Define S as SourceField in the Source (relational) domain and T as TargetField in the target (Object, XML) domain. S(Null)⇔T(A value based on the NullHandling attribute). This means that on Query, Null is output in the database (DB) to the value specified in the NullHandling, NullValue attributes. On update, if the value in the target domain is what was specified in the above attribute, the value is translated in the target domain to null in the source domain. The defaults and the specific behavior for the Null handling in the target domains is specified in each target domain specification.

When creating a new target structure (Object or XML element) and assigning to a field the Null value, or omitting the XML attribute, the default behavior by the update engine is to set the value to the default value defined on the column. If there is no default value, it means that Null will apply.

The ForceNullOnInsert supports the case where the user wants to override the default behavior described above. In this case the user wants the update engine to explicitly write Null into the column and override any default that was defined on the column. Setting the ForceNullOnInsert attribute to TRUE means that when object/element was created, null will be explicitly inserted into the column for any null value in the target domain. The main scenario for this feature is to enable passing Null to a parameter of an Insert stored procedure (exposed as the insert command of a custom table).

NullValue can be presented if the NullHandling value is "UseNullValue".

Blank string as NullValue—In this example, the user would like to specify empty string for null for the customers middle initial property.

```
<FieldMap SourceField="MiddleInitial" TargetField="MI"
    NullHandling="UseNullValue" NullValue=" " />
```

Using DomainNull for null handling—In this example the MI is the name of an element in the XML domain.

```
<FieldMap SourceField="MiddleInitial" TargetField="MI"
    NullHandling="DomainNull"/>
```

The XML would be <MI xsi:nil="true"/>

UseForConcurrency Attribute

The theory and reasoning behind the need for this attribute are specified in the Optimistic Concurrency document. The reason that concurrency is specified in the Mapping and not at the RSD is that in a certain scenarios, the user would like different concurrency setting. Consider a denormalized table that is mapped to two classes. These classes would have different fields that should be used for concurrency control. Generally speaking, people would like to share the same RSD information with different mappings as driven by their business logic. The UseForConcurrency attribute is an enum that has the following values: Always—this field will always be used for concurrency and is the default value; Never—this field will never be used for concurrency; and Modified—this field is used for concurrency only if the value has changed.

The UseForConcurrency attribute can be used both on FieldMap and on Map. The defaulting mechanism is as follows. If the UseForConcurrency is not specified the default is "Always". If the UseForConcurrency is specified on the Map, it will be used as the value of UseForConcurrency for all FieldMap and Relationships involved in the Map, unless the FieldMap or the RelationshipMap has UseForConcurrency already defined. In this case, the defined value will override the default specified on the Map. The UseForConcurrency that is specified on a FieldMap overrides UseForConcurrency defined either on the Map or the RelationshipMap.

Users can control the concurrency settings for relationship field that are not explicitly mapped by specifying the UseForConcurrency attribute on the RelationshipMap element. Note that setting this attribute on the RelationshipMap apply for all the relationship fields.

The validation works as follows. If Alternate Key UseForConcurrency=Always, it will be used for concurrency and the Primary Key concurrency will be determined based on defaulting rules as any other field. Else, If Alternate Key does not exist or is not marked as UseForConcurrency=Always, the Primary Key UseForConcurrency will be defaulted to Always (the mapping engine will ignore the Map UseForConcurrency value). If the UseForConcurrency value on the primary key FieldMap is explicitly set to any other value (either Never or Modified), and the mapping engine will pass through an exception.

EXAMPLES

```
<Map Source="Customers" Target="Cust" UseForConcurrency=
"Modified">
    <FieldMap SourceField="cid" TargetField=
    "CustomerID"/>
    <FieldMap SourceField="street" TargetField="st"
    UseForConcurrency="Never"/>
    <FieldMap SourceField="zip" TargetField="zip"
    UseForConcurrency="Never"/>
    <FieldMap SourceField="house" TargetField="number"
    UseForConcurrency="Never"/>
    <FieldMap SourceField="firstname" TargetField=
    "fname"
    UseForConcurrency="Always"/>
    <FieldMap SourceField="lastname" TargetField=
    "lname"
    UseForConcurrency="Always"/>
    <FieldMap SourceField="status" TargetField=
    "status"/>
</Map>
```

The map is represented internally as follows:

```
<Map Source="Customers" Target="Cust" >
    <FieldMap SourceField="cid" TargetField="CustomerID"
    UseForConcurrency="Always" <!- Ignored from Map-->/>
    <FieldMap SourceField="street" TargetField="st"
    UseForConcurrency="Never"/>
    <FieldMap SourceField="zip" TargetField="zip"
    UseForConcurrency="Never"/>
    <FieldMap SourceField="house" TargetField="number"
    UseForConcurrency="Never"/>
    <FieldMap SourceField="firstname" TargetField="fname"
    UseForConcurrency="Always"/>
    <FieldMap SourceField="lastname" TargetField="lname"
    UseForConcurrency="Always"/>
    <FieldMap SourceField="status" TargetField="status"
    UseForConcurrency="Modified" <!-- Applied from Map -->/>
</Map>
```

Ref Attribute

The Ref attribute value is a name of a Map. The semantics of this attribute is that the target structure or target field is mapped to the same Source of the named map. "Same Source" means the set selected from a table in the relational domain. Based on the semantics of the relational domain, the mapping engine creates a new set of records (select statement) each time a table is mapped. In some cases such as the maverick case in the XML domain the user may want to map a previously created set to a target structure or field. Consider the following scenario (taken from XML domain mapping) where the user has a customer element that contains the customer orders. The Order element contains the customer name.

```
<Customer CustomerID="Alfki">
    <Order orderid="10001" CustomerName="AlfkiName" />
</Customer>
```

The relational structure is Customers and Orders tables with MyBuyer Relationship. Thus, the mapping will look like:

```
<Map Name="MainCustomers" Source="Customers"
Target="Customer">
    <FieldMap SourceField="CustomerID"
    TargetField="@CustomerID" />
    <RelationshipMap Source="MyBuyer" Target="Order" />
</Map>
```

-continued

```
<Map Source="Orders" Target="Customer/Order">
    <FieldMap SourceField="orderId" TargetField="@OID" />
    <FieldMap Ref="MainCustomers" SourceField="name" TargetField="@CustomerName" />
</Map>
```

This is an efficient way to get the customer name on the order element by saving the need to create another set and join. Note the Ref attribute is only used in the XML domain since from each structure (row) in the source domain the mapping can create multiple XML elements. In addition, values from this row can be picked by the any descended in the XML hierarchy, as shown in the example above.

Update Semantics

A powerful attribute of mapping is the capability of being updateable. Many developers that previously needed to write a lot of code to propagate and sync changes in their object or XML domain to the SQL server domain can relay on the mapping engine to do these tasks for them. Users create, delete, or modify a structure (object or XML element) in the target domain, and these changes will be magically synchronized (persistent) to the source domain by the target domain API and the mapping engine known as a change processor (CP) which will be referred in the following section as CP. This section describes the semantics of changes in the target domain that are persistent into the source domain (the relational data model).

The following terms are additions to these concepts of Existence, Copy, and Mapping Relationships described hereinabove.

Target Unit—A structure or a group of structures from the target domain that are mapped using the Map element to the same source structure. A group of target structures are the target on map that is referencing another Map using the Ref attribute (the Target unit includes the referenced Map). This is a saddle difference between the Object domain where such grouping of structures is not possible and each object that is mapped using the Map element is a Target unit, and the XML domain where such group of structures can be created as described above.

Source Unit—A structure in the source domain. In the relational domain, a source it is a CustomTable.

Changed unit—the mapped source unit to the target unit that was changed.

The CP is looking at the relationships of any changed unit to determine the operations, the order of operations, and validations to perform on related units in the source domain. It is very complex to apply changes to the related units in both target and source domains to keep them in sync. The validation rules in the RelationshipMap section ensures that the changes on the target domain will not conflict with changes applied by the CP on the source domain.

This section describes the semantics of the relationship element in the source domain schema (RSD).

From and To

"From" is the Parent unit in the relationship, and "To" is the child unit in a relationship. The distinction between parent unit and child unit is necessary to determine the order of operations in the source domain. The type of change (Insert, delete and update) is used to determine the order of executing the operations, for Insert/Update the parent will execute first and for Delete the child will execute first.

CascadeDelete/CascadeUpdate

When applying changes to the source domain the CP finds all the relationships between the changed unit to other mapped source units where the change unit is the parent. The value of CascadeDelete/CascadeUpdate determines whether the operation affects the child table or not. The value of these attributes determines whether the CP or the SQL Server executes the changes on the child tables.

Calculating Units (Tables) Dependency Using IsForeignKey

The following describes the semantics of calculating table dependencies and rows dependencies within the tables (also called unit dependencies) based on the relationship information to determine row execution order for the update engine CP. The CP uses the information of the Parent (From) and Child (To) and the existence of foreign key constraint denoted by the IsForeignKey attribute on the relationship element, to determine this dependency and the order of execution the update statements.

Following is a simple hierarchy is Customers→Orders→OrderDetails, where there is no circular reference.

```
<rsd:Relationship Name="Northwind.FK_Order_OrderDetails"
From="Northwind.Orders"
To="Northwind.dbo.OrderDetails" Cardinality="OneToMany"
IsForeignKey="true">
    <ColumnJoin Column="OrderID" RelatedColumn="OrderID"/>
</rsd:Relationship>
<rsd:Relationship Name="Northwind.FK_Customer_Order"
From="Northwind.dbo.Customers" To="Northwind.dbo.Orders"
Cardinality="OneToMany"
IsForeignKey="true">
    <ColumnJoin Column="CustomerID"
    RelatedColumn="CustomerID"/>
</rsd:Relationship>
```

Following is a Circular Reference where one relationship is not a FK constraint on the server (IsForeignKey=false). This is the scenario where at least in one relationship the foreign key constraint is not created on the server. The order of mapping is A→B→C.

```
<rsd:Relationship Name="BC " From="B" To="C"
Cardinality="OneToMany"
IsForeignKey="true">
    <ColumnJoin Column="BID" RelatedColumn="BID"/>
</rsd:Relationship>
<rsd:Relationship Name="AB " From="A" To="B"
Cardinality="OneToMany"
IsForeignKey="false"> <!-Here the server does not have an FK
constraint->
    <ColumnJoin Column="AID" RelatedColumn="AID"/>
</rsd:Relationship>
<rsd:Relationship Name="CA" From="C" To="A"
Cardinality="OneToMany"
IsForeignKey="true">
    <ColumnJoin Column="CID" RelatedColumn="CID"/>
</rsd:Relationship>
```

Following is a Circular Reference where all relationships are FK constraints on the server (IsForeignKey=true). In this scenario all of relationships are imposed by foreign key constraints on the server. The order of mapping is C→A→B.

```
<rsd:Relationship Name="CA" From="C" To="A"
Cardinality="OneToMany"
IsForeignKey="true">
    <ColumnJoin Column="CID" RelatedColumn="CID"/>
</rsd:Relationship>
<rsd:Relationship Name="AB " From="A" To="B"
Cardinality="OneToMany"
IsForeignKey="true">
    <ColumnJoin Column="AID" RelatedColumn="AID"/>
</rsd:Relationship>
<rsd:Relationship Name="BC " From="B" To="C"
Cardinality="OneToMany"
IsForeignKey="true">
    <ColumnJoin Column="BID" RelatedColumn="BID"/>
</rsd:Relationship>
``` or

```
<rsd:Relationship Name="EmployeeManager " From="Employee"
To="Employee"
Cardinality="OneToMany" IsForeignKey="true"> <!-Here the
relationship is between the same tableà
    <ColumnJoin Column="EmployeeID"
    RelatedColumn="ManagerID"/>
</rsd:Relationship>
```

At mapping compilation time, the "From" and "To" directional attributes are mainly used to determine the table dependencies. This resolves all simple hierarchical scenarios like the first scenario. On the other hand, in the second and third scenarios above where relationship directions cause circular references, an effort is made to find out the dependency by disregarding the relationship that does not point to a foreign key constraint implemented on the server (IsForeignKey="true"). This will address the second scenario. If there circular reference still exists (i.e., no relationship path is disregarded as all are implemented as foreign key constraints) then the dependency graph will be resolved in to a hierarchical tree in a random way (as described in algorithm section next).

At run time, if a ChangeUnits is received as in the first scenario no further operation is needed and the order of execution is performed as per a compiled dependency graph. However, for a circular reference in the second and third scenarios, run-time instances are evaluated to figure out the right execution order by using ChangeUnit.GetParents( ). In most cases, run-time instances shall not form a graph and ChangeUnits will be executed in a hierarchical manner (HaroonA→DanielD→Foo→Bar→BillG). However, even if run-time instances form a graph, then the units are executed as per compiled time dependencies. This works for the second scenario, while in third scenario where all relationships are referring to foreign key constraints, it will cause server side constraint exceptions for Insert and Delete operations.

The algorithm here enables calculating dependency on mapping compilation time for all scenarios while runtime instances will be evaluated and given preference for circular reference the second and third scenarios. It is to note that the dependency information for all the units once calculated from mapping syntax is stored in an array within compiled mapping where every source unit is assigned a respected relative ordinal. Even in the irresolvable circular reference in the third scenario as discussed above, a graph is randomly broken into a tree in the order of occurrence in mapping file. This guarantees a deterministic order of execution even among unrelated units and hence avoid certain potential deadlock cases.

Cardinality can either be OneToOne and OneToMany. Many-to-many has similar semantics as the OneToMany as it relates to update. The source unit that is specified by "Source" attribute on the "Map" element is termed a Strong Unit, while all the other source units that are specified in underlying "FieldMap" elements are referred as Weak Units. The cardinality information is tightly coupled with the concept of weak and strong units. In OneToMany, Weak Units are considered as Read-Only.

Examples for such scenarios are the ObjectSpace's One Table per Type inheritance and Customer XML element (or Class) mapped to multiple tables (Customer, CustomerInfo). In this case, the behavior is read-write for both strong unit and weak unit and the existence of weak unit rows are tied with the existence of strong unit row. It means that if a target unit is inserted then one row is inserted in the strong unit as well as corresponding rows to all weak units. Likewise, if a target unit is deleted then all the corresponding rows in strong units and weak units are deleted. Deleting attributes that refer to weak units are translated as nullifying the value in the corresponding column regardless of whether this column belongs to strong unit or weak unit. It needs to be made clear that even if all the target fields are deleted that are mapped to a particular weak-unit, the row in the weak unit will not be deleted. A row from a week unit can only go away with the strong unit when the target unit will be deleted. Note that this target field deletion scenario exists only in XLM and does not exist in ObjectSpaces, since properties of a class could not be removed, but rather could only be nullified.

With respect to the Ref attribute on FieldMap, in the case where multiple source units are mapped by making use of "Ref" attribute in the FieldMap, the update semantics is read-only for weak units for all cardinalities. This is compliant with "Ref" attribute semantics that implies another mapping exists to control the update semantics. Read-only semantics means that if a target is inserted then the update operation would only insert a row in strong unit and weak units will not be touched. Likewise, if a target is deleted then only the row on the strong unit will be deleted. Similarly, if attributes referring to the weak units are modified (updated/deleted) then the update engine (CP) will throw exception. A client (ObjectSpaces, XmlCache, etc.) could always override the behavior by not providing modified changes on weak units to CP. This way the changes will be ignored instead of causing exception.

Maps that have Ref attribute instead of source are grouped into one unit and can not be inserted or deleted without the target structure that is mapped in the main map. Conceptually they are part of the main map. The reasons for this behavior is that the main map always guarantee to contain the personal key information and that the mapped structure must be an ancestor of the mapped structure thus it can be the owner structure for that map.

In read-only FieldMaps, the CP will validate that source fields that are mapped in a Read-only FieldMaps are not changed and will throw an error in this case Note that it is an error to bind current parameters of any update commands on the CustomTable to read only target field.

Figure 6A:
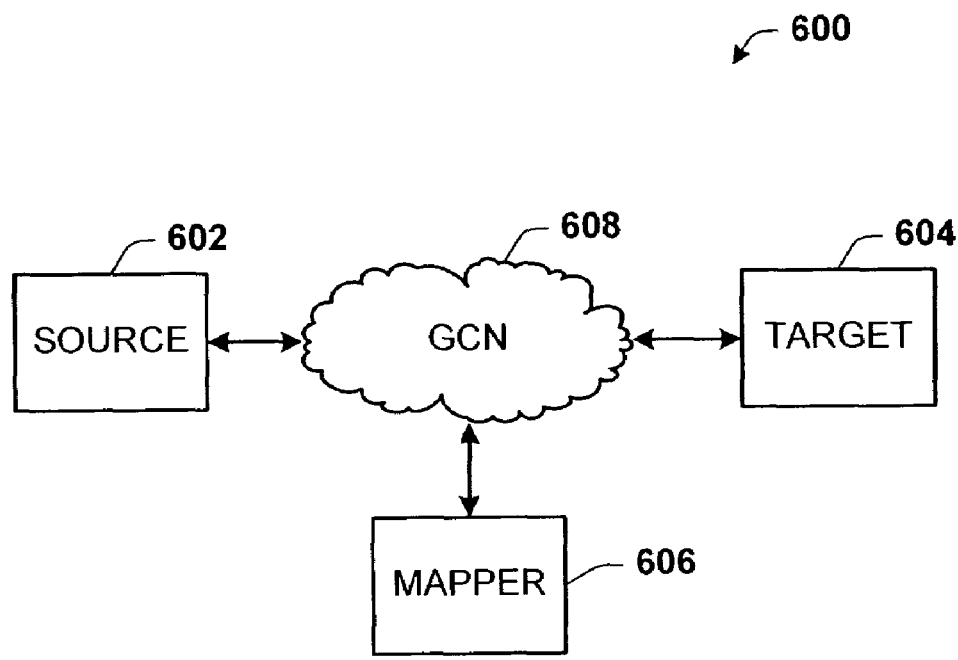
FIG. 6A illustrates a network diagram of a source data source and target data source where a mapping component is separately disposed on the network.

Referring now to FIG. 6A, there is illustrated a network diagram 600 of a source data source 602 and target data source 604 where a mapping component 606 is separately disposed on the network. Both of the source data source 602 and the target data source 604 are read-only, and yet require mapping. In accordance with the present invention, the mapping component 606 is used to perform the mapping from the source 602 to the target 604, wherein a user at the network location of the mapping component 606 configures the mapping component 606 to perform the mapping. This may occur over a global communication network (GCN) 608, such as the Internet. Additionally, the mapping may occur over the network 608, which may be a LAN, WAN, WLAN, WWAN, etc. This scenario facilitates an implementation where a customer subscribes to have the mapping operation performed by a vendor. The vendor simply accesses the source and target data models via the network 608, after perhaps, obtaining login information, although this is not required, and configures the mapping component 606 to perform the mapping operation. This scenario also supports the customer performing his or her own mapping operation via a LAN, WAN, etc.

Figure 6B:
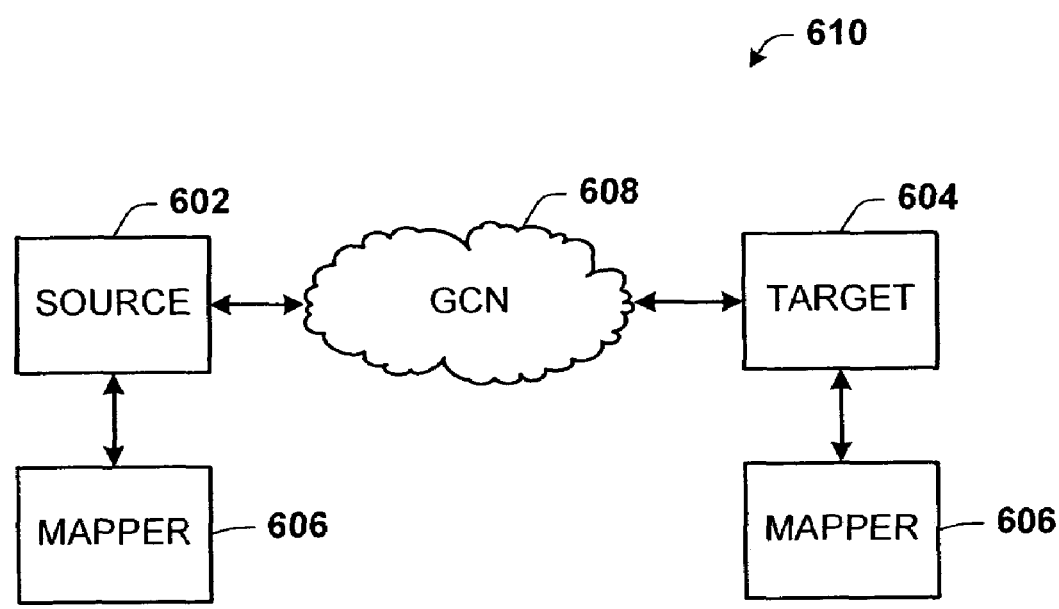
FIG. 6B illustrates a network diagram where the mapping component may be located either at the source location or the target location, or at both locations.

Referring now to FIG. 6B, there is illustrated a network diagram 610 where the mapping component 606 may be located either at the source location or the target location, or at both locations.

Figure 7:
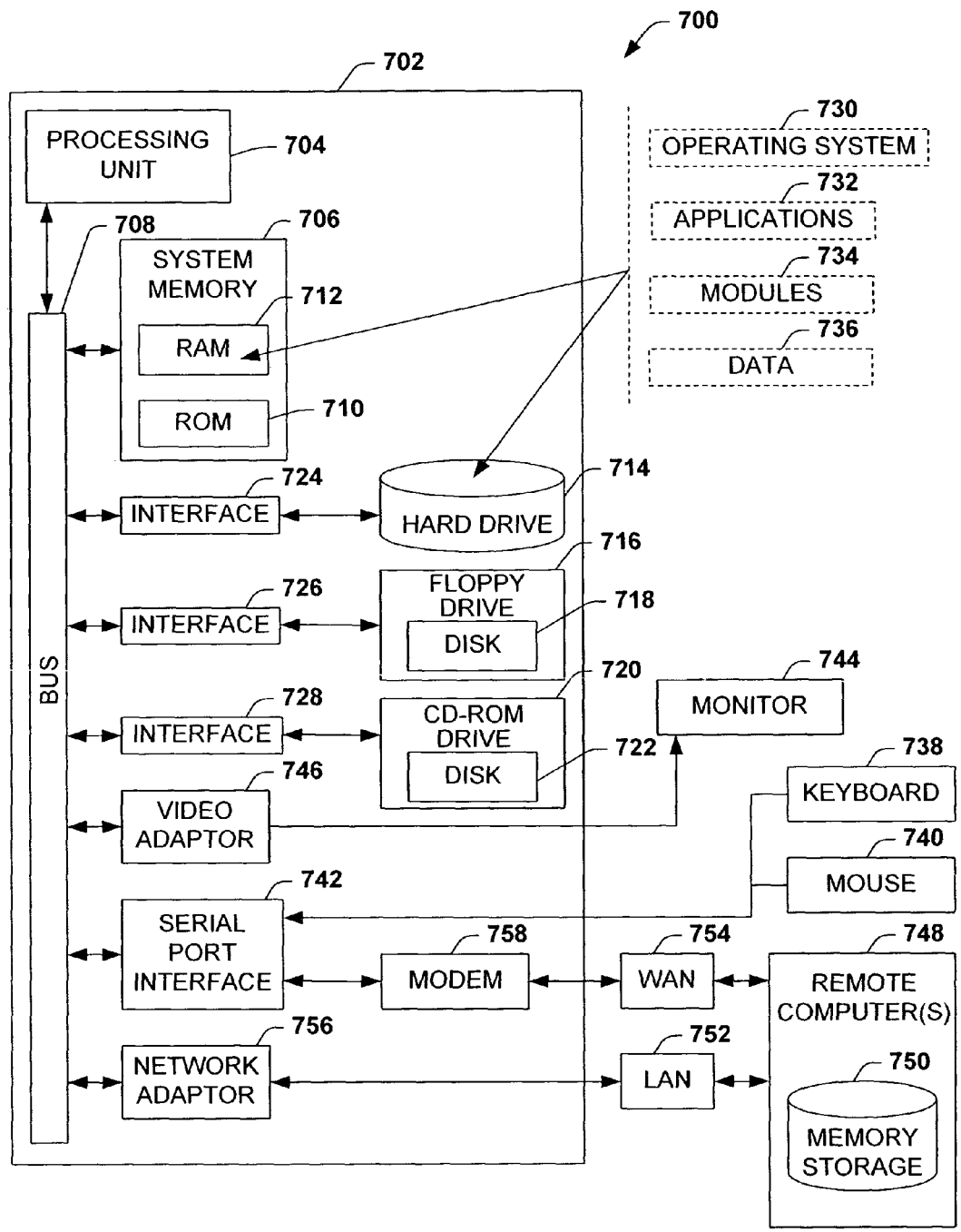
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the present invention, FIG. 7 and the following discussion are intended to provide a brief, general description of a suitable computing environment 700 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 7, there is illustrated an exemplary environment 700 for implementing various aspects of the invention includes a computer 702, the computer 702 including a processing unit 704, a system memory 706 and a system bus 708. The system bus 708 couples system components including, but not limited to the system memory 706 to the processing unit 704. The processing unit 704 may be any of various commercially available processors. Dual microprocessors and other multi-processor architectures also can be employed as the processing unit 704.

The system bus 708 can be any of several types of bus structure including a memory bus or memory controller, a peripheral bus and a local bus using any of a variety of commercially available bus architectures. The system memory 706 includes read only memory (ROM) 710 and random access memory (RAM) 712. A basic input/output system (BIOS), containing the basic routines that help to transfer information between elements within the computer 702, such as during start-up, is stored in the ROM 710.

The computer 702 further includes a hard disk drive 714, a magnetic disk drive 716, (e.g., to read from or write to a removable disk 718) and an optical disk drive 720, (e.g., reading a CD-ROM disk 722 or to read from or write to other optical media). The hard disk drive 714, magnetic disk drive 716 and optical disk drive 720 can be connected to the system bus 708 by a hard disk drive interface 724, a magnetic disk drive interface 726 and an optical drive interface 728, respectively. The drives and their associated computer-readable media provide nonvolatile storage of data, data structures, computer-executable instructions, and so forth. For the computer 702, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 712, including an operating system 730, one or more application programs 732, other program modules 734 and program data 736. It is appreciated that the present invention can be implemented with various commercially available operating systems or combinations of operating systems.

A user can enter commands and information into the computer 702 through a keyboard 738 and a pointing device, such as a mouse 740. Other input devices (not shown) may include a microphone, an IR remote control, a joystick, a game pad, a satellite dish, a scanner, or the like. These and other input devices are often connected to the processing unit 704 through a serial port interface 742 that is coupled to the system bus 708, but may be connected by other interfaces, such as a parallel port, a game port, a universal serial bus ("USB"), an IR interface, etc. A monitor 744 or other type of display device is also connected to the system bus 708 via an interface, such as a video adapter 746. In addition to the monitor 744, a computer typically includes other peripheral output devices (not shown), such as speakers, printers etc.

The computer 702 may operate in a networked environment using logical connections to one or more remote computers, such as a remote computer(s) 748. The remote computer(s) 748 may be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include a local area network (LAN) 752 and a wide area network (WAN) 754. Such networking environments are commonplace in offices, enterprise-wide computer networks, intranets and the Internet.

When used in a LAN networking environment, the computer 702 is connected to the local network 752 through a network interface or adapter 756. The adaptor 756 may facilitate wired or wireless communication to the LAN 752, which may also include a wireless access point disposed thereon for communicating with the wireless adaptor 756. When used in a WAN networking environment, the computer 702 typically includes a modem 758, or is connected to a communications server on the LAN, or has other means for establishing communications over the WAN 754, such as the Internet. The modem 758, which may be internal or external, is connected to the system bus 708 via the serial port interface 742. In a networked environment, program modules depicted relative to the computer 702, or portions thereof, may be stored in the remote memory storage device 750. It will be appreciated that the network connections shown are exemplary and other means of establishing a communications link between the computers may be used.

Figure 8:
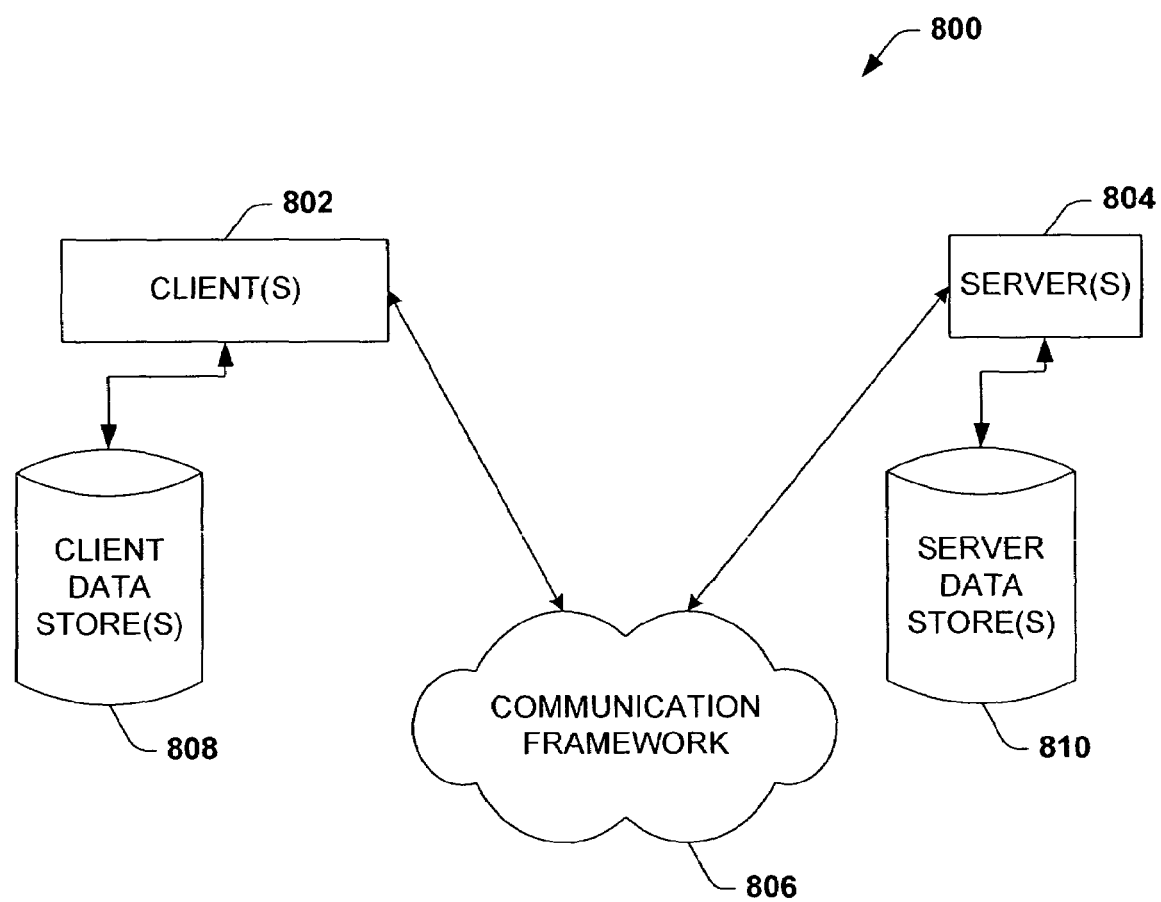
FIG. 8 illustrates a schematic block diagram of an exemplary computing environment in accordance with the present invention.

Referring now to FIG. 8, there is illustrated a schematic block diagram of an exemplary computing environment 800 in accordance with the present invention. The system 800 includes one or more client(s) 802. The client(s) 802 can be hardware and/or software (e.g., threads, processes, computing devices). The client(s) 802 can house cookie(s) and/or associated contextual information by employing the present invention, for example. The system 800 also includes one or more server(s) 804. The server(s) 804 can also be hardware and/or software (e.g., threads, processes, computing devices). The servers 804 can house threads to perform transformations by employing the present invention, for example. One possible communication between a client 802 and a server 804 may be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804. Communications may be facilitated via a wired (including optical fiber) and/or wireless technology. The client(s) 802 operatively connect to one or more client data store(s) 808 that can be employed to store information local to the client(s) 802 (e.g. cookie(s) and/or associated contextual information). Similarly, the server(s) 804 operatively connect to one or more server data store(s) 810 that can be employed to store information local to the servers 804.

Figure 9:
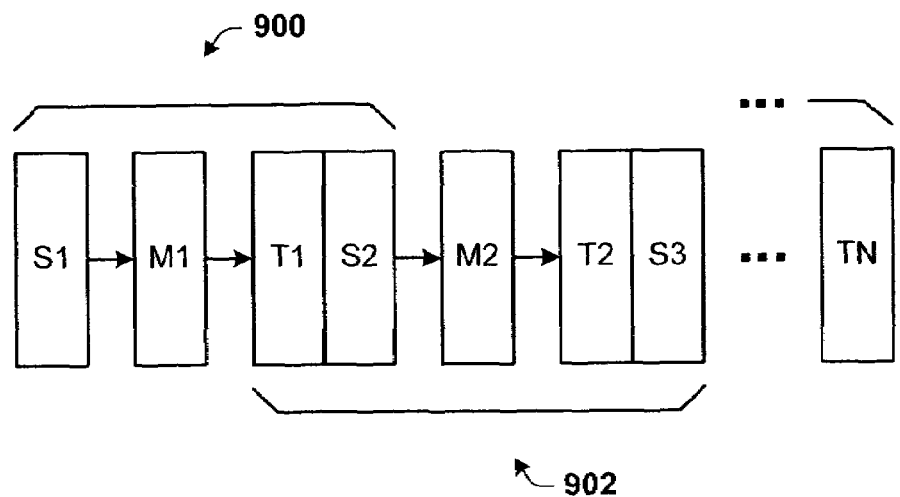
FIG. 9 illustrates a block diagram of a daisy-chain mapping implementation in accordance with the present invention.

Referring now to FIG. 9, there is illustrated a block diagram of a daisy-chain mapping implementation in accordance with the present invention. It is to be appreciated that the disclosed novel mapping architecture facilitates implementation of a daisy-chain mapping scenario where multiple stages 900 similar to the system 100 of FIG. 1 may be configured in a serial fashion from a source data model $S_1$ (of any structure) to a target data model $T_N$ (of any structure), with any number of intermediate stages to make the necessary intermediate data transformations, to ultimately provide the desired data format at the target data model $T_N$ (destination). A stage 900 in this context is represented to include a source model S, a mapping component M, and a target data model T. When daisy-chaining with multiple stages 900, an intermediate target data model T1 is also a data source S2 for the subsequent stage 902. Thus, an intermediate data model (e.g., T1/S2) is labeled as both T1 for the target of the mapping component M1 of the preceding stage 900, and S2 for source of the succeeding mapping component M2 of the succeeding stage 902.

The data models can include, but are not limited to query languages, data access languages, data manipulation languages, data definition languages, Object models, relational model, and XML models.

In one example, the goal is to map data from a source data model S1 to a target data model T2. Consider that the source S1 is a relational data structure and the target T2 is an XML data structure. Further consider that the path from the source S1 to the target T2 provides only an object-based path. The first stage mapping component M1 uses the appropriate relational description component for the source S1 and object description component for the target T1 to map the source S1 to the intermediate target T1. Next, the intermediate target T1 is not the source S2 for the mapping component M2. Mapping component M2 then uses the appropriate object description component and the XML description component to complete the mapping from source S2 to target T2.

In view of such capabilities, it is appreciated that any number of stages (900 and 902) can be employed in accordance with the particular application.

Figure 10:
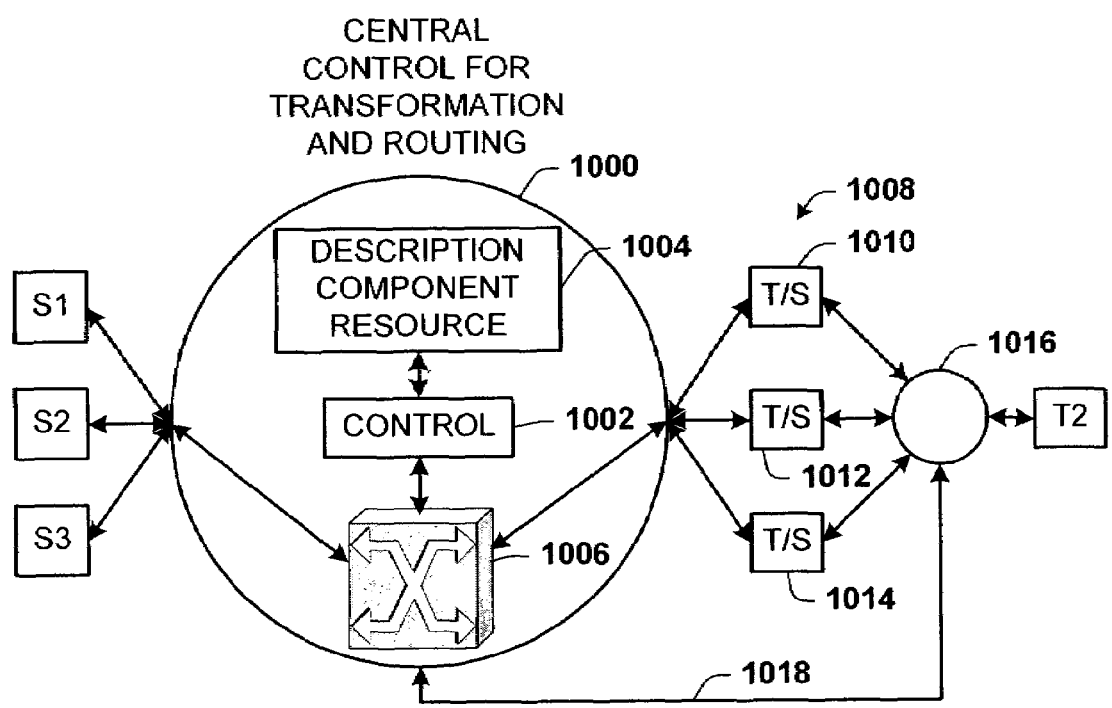
FIG. 10 illustrates a hub-and-spoke implementation of the mapping architecture of the present invention.

Referring now to FIG. 10, there is illustrated a hub-and-spoke implementation of the mapping architecture of the present invention. This implementation is particularly useful in a large network environment, e.g., the Internet or large corporate network, where the usefulness of data paths at any point in time can be impacted due to network interruptions, available bandwidth, etc. There is provided a central control entity 1000 in communication with any number of data sources (S1, S2, and S3) from and/or through which data is being moved or queried, and any number of intermediate data targets 1008 (also denoted as T/S). Ultimately, it may be desired that the mapping is from one of the sources (S1, S2, and S3) to a target T2.

The central control entity 1000 includes a control component 1002 for controlling all aspects of the entity 1000, including a description component resource 1004 that stores a number of accessible description algorithms for transforming data from one type of data model to another (e.g., a relational, Object, XML, . . . ), and a switching mechanism 1006 for routing or switching data between the sources (S1, S2, and S3) and intermediate targets 1008.

In operation, for example, a data query is initiated from a first intermediate datasource target 1010 to the source S1. The data structure of the source S1 is relational and the target 1010 is XML. The query from the target 1010 to the source S1 provides the transformation information to the control component 1002 such that the appropriate relational-to-XML mapping algorithm may be retrieved and/or generated from the resource 1004 for use in completing the mapping. The mapping function is then part of the entity 1000.

In a more extensive example, where map requests (queries or updates) made against one data model cam be translated into requests to one or more different data models, if the query initiates from the target T2 through any one of intermediate target/sources 1008 to source S1, the entity 1000 can select the most optimal path through the intermediate datasource 1008. For example, if the source S1 is relational, the target T2 is XML, the first intermediate datasource 1010 is object-based, a second intermediate datasource 1012 is relational-based, and a third intermediate datasource 1014 is XML-based, the entity 1000 may determine that the most optimal path would be from source S1 through the second intermediate datasource 1012 to the target T2. Once this determination is made, the control component 1002 employs a relational-to-relational mapping (from the resource 1004) from the source S1 to intermediate datasource 1012, whereby a mapping component in a second control entity 1016 (similar to the control entity 1000) employs a relational-to-XML mapping from the second intermediate datasource 1012 to the target T2. The control entities (1000 and 1016) may communicate via a link 1018 to coordinate path selection via any one of the communication paths through the datasources to the target T2.

As indicated above, mapping between datasources can be to similar data structures, e.g., relational-to-relational, XML-to XML, and so on. That is, a scenario can exist where the source relational database can be mapped to a target relational database having a different relational structure. Similarly, a scenario can exist where the source object data can be mapped to a target object data model having a different object structure. Still further, a scenario can exist where the source XML data can be mapped to a target XML data model having a different XML structure.

Figure 11:
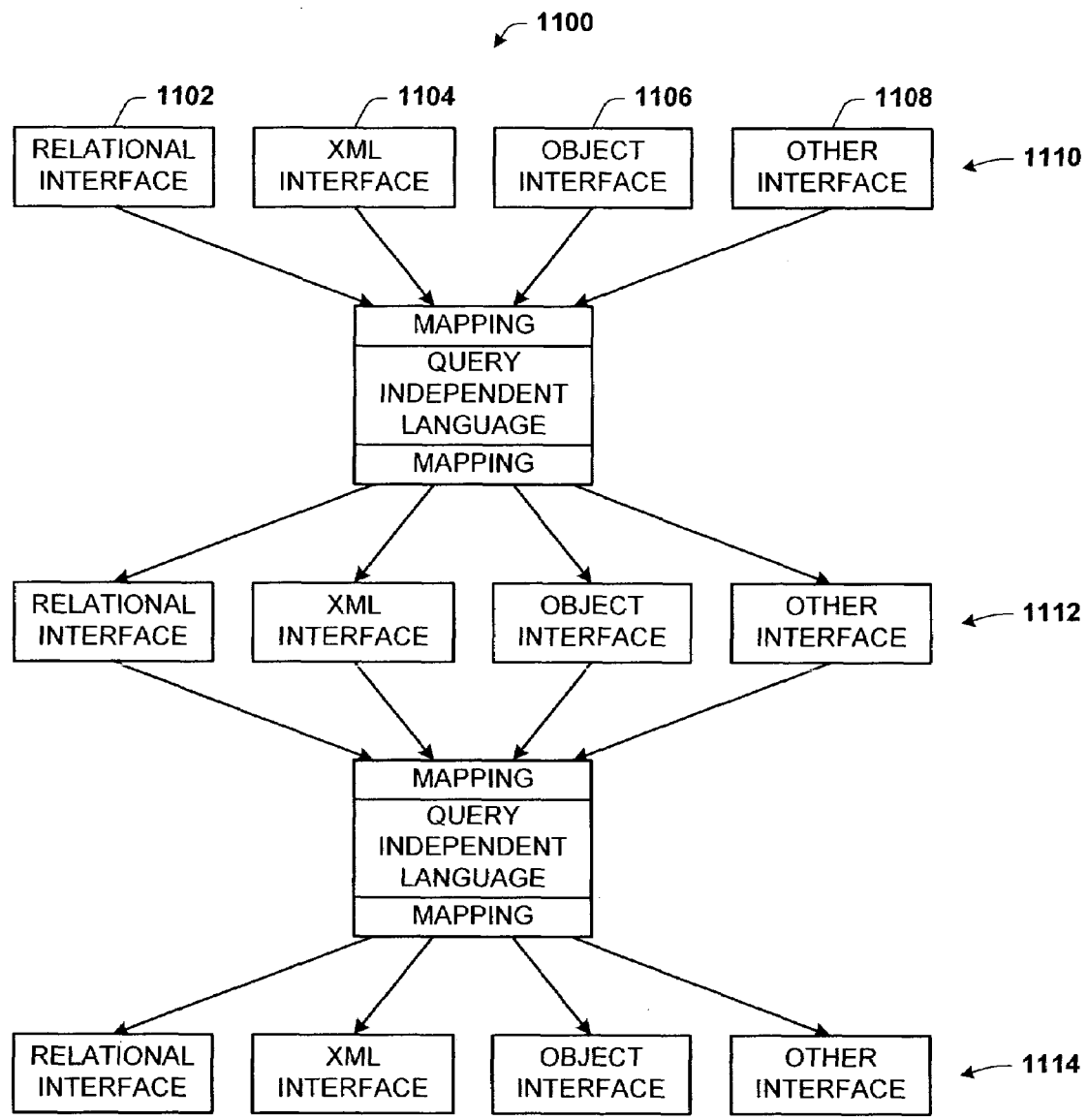
FIG. 11 illustrates a stackable structure in accordance with an aspect of the present invention.

Referring now to FIG. 11, there is illustrated a stackable structure 1100 in accordance with an aspect of the present invention. This capability is employed in the network implementation of FIG. 10. The mapping framework provides a set of convenient formats, APIs (Application Programmable Interfaces), optimizers, utilities, and tools to allow a user to implement data processing between any two arbitrary data models. Anyone can implement his own query to QIL (query independent language) compiler in order to execute against any other data sources automatically. QIL is a universal datasource independent representation for a query (or update) to a datasource. Mapping allows the capability to map requests (queries or updates) made against one data model to be translated into requests to a different data model.

The illustrated APIs include relational 1102, XML 1104, Object 1106, and other 1108. Thus a query can move through several layers (1110, 1112, and 1114) of mapping in order to get executed, and the results can be remapped several times before being returned. The mappings and QIL are composable. Mapping is two-way, i.e., reversible, and allows the performance of updates naturally.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates mapping arbitrary data models and is recorded on a computer-readable storage medium, comprising a mapping component that receives respective metadata from at least two arbitrary data models, and maps expressions comprising at least one of a structure, field, and relationship between the data models;
   wherein the mapping component performs the mapping between the data models is directional and the data models include a source domain and a target domain, wherein the directionality of the mapping influences mapping implementation and semantics for each of the arbitrary data models including data models of the source domain and the target domain such that models mapped as the source have one or more different characteristics than models mapped as the target, wherein the target domain comprises a structure and a field that can only be mapped once while the source domain comprises a structure and a field that can be mapped multiple times, and wherein the mapping between the data models is stackable, such that multiple stages of mappings occur from the source domain to the target domain, the stackable mapping allowing a user to implement data processing between any two arbitrary data models;
   wherein the mapping component allows a user to operate on the data models through a query language of the target domain and provides use of other languages in combination with the mapping to transform the target or source domain;
   wherein the mapping between the data models translates a query written in a query language of the target domain into a query language of the source domain; and
   wherein the mapping component facilitates automatically synchronizing updates, wherein the updates allow the user to specify different behavior for the mapping by including a user-specified structured query language statement that is to be executed when a query, update, insert or delete command is called based on the mapping, and wherein when a user creates, deletes, or modifies a structure in the target domain, these changes are automatically persisted to the source domain.

2. The system of claim 1, wherein the data models are query languages.

3. The system of claim 1, wherein the data models are data access languages.

4. The system of claim 1, wherein the data models are data manipulation languages.

5. The system of claim 1, wherein the data models are data definition languages.

6. The system of claim 1, wherein the data models include at least an object model and at least one relational model where the object model is mapped to at least one of the relational models.

7. The system of claim 1, wherein the data models include object models where one of the object models is mapped to at least one of the other object models.

8. The system of claim 1, wherein the data models include an XML model and at least one relational model where the XML model is mapped to at least one of the relational models.

9. The system of claim 1, wherein the data models are XML models where one of the XML models is mapped to at least one of the other XML models.

10. The system of claim 1, wherein the data models include an XML model and at least one object model where the XML model is mapped to at least one of the object models.

11. The system of claim 1, wherein the data models are relational models where one relational model is mapped to at least one of the other relational models.

12. The system of claim 1, wherein the data models include an XML model and an object model where the object model is mapped to at least one of the XML models.

13. The system of claim 1, wherein the data models are of the same structure.

14. The system of claim 1, wherein the mapping component receives topology data that is derived from the metadata.

15. The system of claim 1, wherein the data models are read-only.

16. The system of claim 1, wherein the expressions mapped between the data models are at least one of the same, different, and a combination of the same and different.

17. The system of claim 1, wherein the mapping component creates structural transformations on the data of a data model by at least one of creating or collapsing hierarchies, moving attributes from one element to another, and introducing new relationships.

18. The system of claim 1, wherein the mapping component relates and connects the same mappable concepts between the data models.

19. The system of claim 1, wherein the data models include a source domain and a target domain such that the source domain is the persistent location of the data.

20. The system of claim 1, wherein the mapping component includes a mapping file that maps like concepts of the respective metadata.

21. A system that facilitates mapping arbitrary data models and is recorded on a computer-readable storage medium, comprising:

source metadata that represents source concepts of a source data source;

target metadata that represents target concepts of at least one target data source;

a mapping component that receives the source metadata and the target metadata and maps the concepts from the source data source to the target metadata associated with one or more of the target data sources;

wherein the data models are mapped without modifying the metadata or structure of the data models themselves;

wherein the mapping of the concepts between the source data source to the target data source is directional, and wherein the mapping between the data models is stackable, such that multiple stages of mappings occur from the source domain to the target domain, the stackable mapping allowing a user to implement data processing between any two arbitrary data models, wherein the directionality of the mapping influences mapping implementation and semantics for each of the arbitrary data models including data models of the source domain and the target domain such that models mapped as the source have one or more different characteristics than models mapped as the target, wherein the target domain comprises a structure and a field that can only be mapped once while the source domain comprises a structure and a field that can be mapped multiple times;

wherein the mapping component allows a user to operate on the source data source and the target data source through a query language of the target data source; and wherein the mapping component facilitates automatically synchronizing updates, wherein the updates allow the user to specify different behavior for the mapping by including a user-specified structured query language statement that is to be executed when a query, update, insert or delete command is called based on the mapping, and wherein such that when a user creates, deletes, or modifies a structure in the target domain, these changes are automatically persisted to the source domain.

22. The system of claim 21, wherein the mapped concepts are at least one of the same, different, and a combination of the same and different.

23. The system of claim 21, wherein the data sources are of the same structure.

24. The system of claim 21, wherein the source concepts and the target concepts are the same in both of the data sources.

25. The system of claim 21, wherein the mapping component relates and maps the same concepts between the data sources.

26. The system of claim 21, wherein the source and target concepts include a relationship element that is a link and association between two structures in the same data source.

27. The system of claim 26, wherein the relationship element defines how a first structure relates to a second structure in the same data source.

28. The system of claim 21, wherein the source data source and the target data source are disposed on a network remote from the mapping component.

29. The system of claim 21, wherein the mapping component is local to at least one of the source data source and the target data source.

30. A computer implemented method of mapping data between data models, comprising the following computer executable acts:

receiving respective metadata from at least two arbitrary data models;

mapping expressions comprising at least one of a structure, field, and relationship between at least two of the data models based upon the metadata, wherein the expressions are directionally mapped between the data models, wherein the directionality of the mapping influences mapping implementation and semantics for each of the arbitrary data models including data models of the source domain and the target domain such that models mapped as the source have one or more different characteristics than models mapped as the target, wherein the target domain comprises a structure and a field that can only be mapped once while the source domain comprises a structure and a field that can be mapped multiple times;

creating a source domain and a target domain from the data models via the directional mapping;

stacking multiple stages of mappings from the source domain to the target domain, wherein stackable mapping allows a user to implement data processing between any two arbitrary data models;

allowing a user to operate on the data models through a query language of the target domain;

translating a query written in a query language of the target domain into a query language of the source domain;

automatically synchronizing updates and persisting changes to the source domain, wherein the updates allow the user to specify different behavior for the mapping by including a user-specified structured query language statement that is to be executed when a query, update, insert or delete command is called based on the mapping; and transforming data during a mapping of a source data model to a target data model using a function.

31. The method of claim 30, wherein the expressions mapped between the two data models are the same expressions.

32. The method of claim 30, further comprising defining a source data schema and a target data schema and information missing in the schemas.

33. A computer implemented method for mapping arbitrary data models, comprising the following computer executable acts:

receiving source metadata that represents source concepts of a source data source and target metadata that represents target concepts of a target data source;

directionally mapping the concepts between the source and target data sources based upon the source metadata and the target metadata, wherein the directionality of the mapping influences mapping implementation and semantics for each of the arbitrary data models including data models of the source domain and the target domain such that models mapped as the source have one or more different characteristics than models mapped as the target, wherein the target domain comprises a structure and a field that can only be mapped once while the source domain comprises a structure and a field that can be mapped multiple times;

stacking multiple stages of mappings from the source domain to the target domain, wherein stackable mapping allows a user to implement data processing between any two arbitrary data models;

mapping the data models without modifying the metadata or structure of the data models themselves;

allowing a user to operate on the source and target data sources through a query language of the target data source;

automatically synchronizing updates and persisting changes to the source domain, wherein the updates allow the user to specify different behavior for the mapping by including a user-specified structured query language statement that is to be executed when a query, update, insert or delete command is called based on the mapping; and selecting an optimal path for mapping between the source and the target.

34. The method of claim 33, wherein the data sources are of the same structure.

35. The method of claim 33, further comprising, creating a variable in a source domain;

restricting the variable with conditions; and mapping the variable to the target concept.

36. The method of claim 35, wherein the variable is created at least one of implicitly and explicitly.

37. The method of claim 35, wherein the variable represents an empty result set.

38. The method of claim 33, wherein the mapping is stackable between the source and target data via one or more intermediate mapping stages.

39. The method of claim 33, wherein the optimal path is selected with a central control entity based on at least one of available bandwidth and interruptions in the path.

40. The method of claim 33, further comprising accessing a mapping algorithm in response to selecting an optimal path between a plurality of the data sources and plurality of the data targets.

41. The method of claim 40, wherein the mapping algorithm is associated with a structure of the source data and the target data.

42. A system that facilitates mapping data between arbitrary data models and is recorded on a computer-readable storage medium, comprising:

means for receiving source metadata that represents source concepts of a source data source and target metadata that represents target concepts of a target data source;

means for mapping the concepts between the source and target data sources based upon the source metadata and the target metadata, wherein the mapping between the data models is stackable and directional, such that multiple stages of mappings occur from the source domain to the target domain, the stackable mapping allowing a user to implement data processing between any two arbitrary data models, wherein the directionality of the mapping influences mapping implementation and semantics for each of the arbitrary data models including data models of the source domain and the target domain such that models mapped as the source have one or more different characteristics than models mapped as the target, wherein the target domain comprises a structure and a field that can only be mapped once while the source domain comprises a structure and a field that can be mapped multiple times;

means for mapping the source and target data sources without modifying the metadata or structure of the data sources themselves;

means for allowing a user to operate on the source and target data sources through a query language of the target data source;

means for translating a query written in a query language of the target data source into a query language of the source data source; and means for automatically synchronizing updates and persisting changes to the source domain, wherein the updates allow the user to specify different behavior for the mapping by including a user-specified structured query language statement that is to be executed when a query, update, insert or delete command is called based on the mapping.

43. The system of claim 42, wherein the means for mapping includes a mapping means that relates and maps the same concepts between the data sources.

* * * * *